US012640499B2

(12) United States Patent
Neenan et al.

(10) Patent No.: US 12,640,499 B2
(45) Date of Patent: May 26, 2026

(54) ANTENNA SYSTEMS

(71) Applicant: Parsec Technologies, Inc., Plano, TX (US)

(72) Inventors: Michael A. Neenan, Plano, TX (US); Richard Loy Smith, Jr., Dallas, TX (US); Rauhon Ahmed Shaik, Wylie, TX (US); George Alexander Bednekoff, Plano, TX (US)

(73) Assignee: Parsec Technologies, Inc., Plano, TX (US)

(*) Notice: Subject to any disclaimer, the term of this patent is extended or adjusted under 35 U.S.C. 154(b) by 101 days.

(21) Appl. No.: 18/466,691

(22) Filed: Sep. 13, 2023

(65) Prior Publication Data

US 2025/0087905 A1 Mar. 13, 2025

(51) Int. Cl.
*H01Q 21/28* (2006.01)
*H01Q 1/42* (2006.01)

(52) U.S. Cl.
CPC ............... *H01Q 21/28* (2013.01); *H01Q 1/42* (2013.01)

(58) Field of Classification Search
CPC ................................. H01Q 1/42; H01Q 21/28
See application file for complete search history.

(56) References Cited

U.S. PATENT DOCUMENTS

| | | | |
|---|---|---|---|
| 5,966,102 | A | 10/1999 | Runyon |
| 6,067,053 | A | 5/2000 | Runyon |
| 6,111,550 | A | 8/2000 | Miller et al. |
| 9,379,453 | B2 | 6/2016 | Rentz |
| 10,224,615 | B2 | 3/2019 | Wu |
| 10,312,583 | B2 | 6/2019 | Ng |
| 11,251,539 | B2 | 2/2022 | Hinman |
| 11,283,149 | B2 | 3/2022 | Neenan et al. |

(Continued)

FOREIGN PATENT DOCUMENTS

| | | |
|---|---|---|
| CN | 102097674 | 6/2011 |
| CN | 102468529 | 5/2012 |

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

*Primary Examiner* — Hoang V Nguyen
(74) *Attorney, Agent, or Firm* — Knobbe, Martens, Olson & Bear, LLP

(57) ABSTRACT

An antenna assembly can include a front cover and a back cover, the back cover configured to be coupled to the front cover. The antenna assembly can include a PCB base positioned between the front cover and the back cover. The antenna assembly can include a first multi-band antenna element formed on the PCB base, and a second multi-band antenna element formed on the PCB base. The first multi-band antenna element can include a first ground plane, one or more first low-band radiating elements, one or more first mid-band radiating elements, and one or more first high-band radiating elements. The second multi-band antenna element can include a second ground plane, one or more second low-band radiating elements, one or more second mid-band radiating elements, and one or more second high-band radiating elements.

20 Claims, 13 Drawing Sheets

(56) References Cited

U.S. PATENT DOCUMENTS

| | | | | |
|---|---|---|---|---|
| 11,329,363 | B1 | 5/2022 | Neenan et al. | |
| 11,658,382 | B2 | 5/2023 | Neenan et al. | |
| 11,664,574 | B2 | 5/2023 | Neenan et al. | |
| 11,909,090 | B2 | 2/2024 | Neenan et al. | |
| 11,936,094 | B2 | 3/2024 | Neenan et al. | |
| 12,057,641 | B2 | 8/2024 | Neenan et al. | |
| 12,212,035 | B2 | 1/2025 | Neenan et al. | |
| 12,266,845 | B2 | 4/2025 | Neenan et al. | |
| 2010/0253584 | A1 | 10/2010 | Yang et al. | |
| 2011/0080323 | A1 | 4/2011 | Thiam | |
| 2011/0102278 | A1 | 5/2011 | Rozan | |
| 2012/0146872 | A1 | 6/2012 | Chainon et al. | |
| 2012/0280882 | A1 | 11/2012 | Zimmerman | |
| 2014/0139387 | A1 | 5/2014 | Jones et al. | |
| 2014/0375507 | A1 | 12/2014 | Lin et al. | |
| 2015/0042521 | A1 | 2/2015 | Hazen | |
| 2015/0102974 | A1 | 4/2015 | Stoytchev et al. | |
| 2016/0172750 | A1 | 6/2016 | Ng | |
| 2016/0248148 | A1 | 8/2016 | Hill et al. | |
| 2016/0277062 | A1 | 9/2016 | Cheon et al. | |
| 2016/0285161 | A1* | 9/2016 | Apaydin ................ | H01Q 1/521 |
| 2017/0062952 | A1 | 3/2017 | Sundararajan | |
| 2017/0237158 | A1 | 8/2017 | Gibson et al. | |
| 2017/0317428 | A1 | 11/2017 | Petropoulos | |
| 2017/0324171 | A1 | 11/2017 | Shehan | |
| 2017/0358842 | A1 | 12/2017 | Shehan | |
| 2018/0062731 | A1 | 3/2018 | Ng et al. | |
| 2018/0083348 | A1 | 3/2018 | Thiam et al. | |
| 2018/0109006 | A1 | 4/2018 | Ng et al. | |
| 2018/0323513 | A1 | 11/2018 | Varnoosfaderani et al. | |
| 2019/0148825 | A1 | 5/2019 | Huerta et al. | |
| 2019/0237850 | A1 | 8/2019 | Fleischer et al. | |
| 2019/0305406 | A1 | 10/2019 | Williams | |
| 2019/0341674 | A1 | 11/2019 | Rosenthal et al. | |
| 2019/0356051 | A1 | 11/2019 | Barrera et al. | |
| 2020/0112101 | A1 | 4/2020 | Yun | |
| 2020/0350664 | A1 | 11/2020 | Thill | |
| 2020/0373668 | A1 | 11/2020 | Wu | |
| 2020/0411972 | A1 | 12/2020 | Hicks et al. | |
| 2021/0305718 | A1 | 9/2021 | Li | |
| 2021/0391655 | A1 | 12/2021 | Brobston et al. | |
| 2022/0384966 | A1 | 12/2022 | Chiang et al. | |
| 2023/0145053 | A1 | 5/2023 | Kilbury et al. | |
| 2023/0223709 | A1 | 7/2023 | Guntupalli | |
| 2023/0402732 | A1 | 12/2023 | Neenan et al. | |
| 2024/0097339 | A1 | 3/2024 | Khatua | |
| 2024/0113450 | A1 | 4/2024 | Neenan et al. | |
| 2024/0113451 | A1 | 4/2024 | Neenan et al. | |
| 2024/0128644 | A1 | 4/2024 | Neenan et al. | |
| 2024/0304958 | A1 | 9/2024 | Matsumura | |
| 2024/0347892 | A1 | 10/2024 | Neenan et al. | |
| 2025/0079683 | A1 | 3/2025 | Neenan et al. | |
| 2025/0079704 | A1 | 3/2025 | Neenan et al. | |
| 2025/0158289 | A1 | 5/2025 | Neenan et al. | |
| 2025/0167459 | A1 | 5/2025 | Neenan et al. | |

FOREIGN PATENT DOCUMENTS

| | | | |
|---|---|---|---|
| CN | 203562507 | 4/2014 | |
| CN | 105281049 | 1/2016 | |
| CN | 210806018 | 6/2020 | |
| CN | 212303910 | 1/2021 | |
| CN | 114465021 | 5/2022 | |
| CN | 116151285 | 5/2023 | |
| DE | 202017002307 U1 | 8/2017 | |
| EP | 0 349 499 | 1/1990 | |
| EP | 3 474 376 | 4/2019 | |
| EP | 3 614 491 | 2/2020 | |
| EP | 3614491 A1 * | 2/2020 | ............. H01Q 21/26 |
| KR | 102260880 | 6/2021 | |
| WO | WO-2005062422 A1 * | 7/2005 | ............. H01Q 1/243 |
| WO | WO 2013/090783 | 6/2013 | |
| WO | WO-2018140305 A1 * | 8/2018 | ............... H01Q 1/22 |
| WO | WO 2020/010039 | 1/2020 | |
| WO | WO 2023/128683 | 7/2023 | |
| WO | WO 2024/035801 | 2/2024 | |
| WO | WO 2024/035805 | 2/2024 | |
| WO | WO 2024/035810 | 2/2024 | |

* cited by examiner

ANTENNA SYSTEMS

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, Long Term Evolution (LTE) has become a standard in wireless data communications technology. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennae that are configured to electromagnetically resonate at frequencies within the dedicated bandwidth. As more wireless devices are used on a frequency bandwidth, a communication bottleneck occurs as wireless devices compete for frequency channels within a dedicated bandwidth. LTE frequency bands range from 450 MHz to 6 GHz, however, antennas configured to resonate within this spectrum only resonate within a portion of the full LTE spectrum. To capture a greater portion of the LTE spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems and which can result in systems with poor functionality and/or coverage.

SUMMARY

This disclosure relates to antennas that cover multiple frequency bands that are prolific in today's telecommunication wireless spectrum. The advances of telecommunications wireless devices have expanded the number of frequency bands that a radio can support for prolific coverage. For example, there are over 30 5G Bands that a radio may be asked to support if the radio is to provide ubiquitous coverage for a mobile device. While some of the LTE Bands overlap one another, there are numerous gaps between the bands as well. A multi-band approach to the antenna's frequency response provides a unique and novel radiating structure to support the numerous 5G bands.

According to some embodiments, an antenna assembly is disclosed. The antenna assembly can include a front cover, a back cover, the back cover configured to be coupled to the front cover; a PCB base positioned between the front cover and the back cover, a first multi-band antenna element formed on the PCB base, and a second multi-band antenna element formed on the PCB base. The first multi-band antenna element can include a first ground plane; one or more first low-band radiating elements; one or more first mid-band radiating elements; and one or more first high-band radiating elements. The second multi-band antenna element can include a second ground plane; one or more second low-band radiating elements; one or more second mid-band radiating elements; and one or more second high-band radiating elements.

According to some embodiments, a multi-band antenna element formed on a PCB base is disclosed. The multi-band antenna element can include a ground plane; one or more low-band radiating elements; one or more mid-band radiating elements; and one or more high-band radiating elements.

According to some embodiments, an antenna assembly is disclosed. The antenna assembly can include a front cover; a back cover, the back cover configured to be coupled to the front cover; a first PCB base positioned between the front cover and the back cover; a second PCB base positioned between the front cover and the back cover; the second PCB base adjacent to the first PCB base; a first multi-band antenna element formed on the first PCB base; a second multi-band antenna element formed on the first PCB base; a third multi-band antenna element formed on the second PCB base; and a fourth multi-band antenna element formed on the second PCB base.

Some advantageous features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one implementation of the present disclosure in detail, it is to be understood that the implementations are not limited in its application to the details of construction and the arrangements of the components set forth in the following description or illustrated in the drawings. The implementations are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. Accordingly, the claims should be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
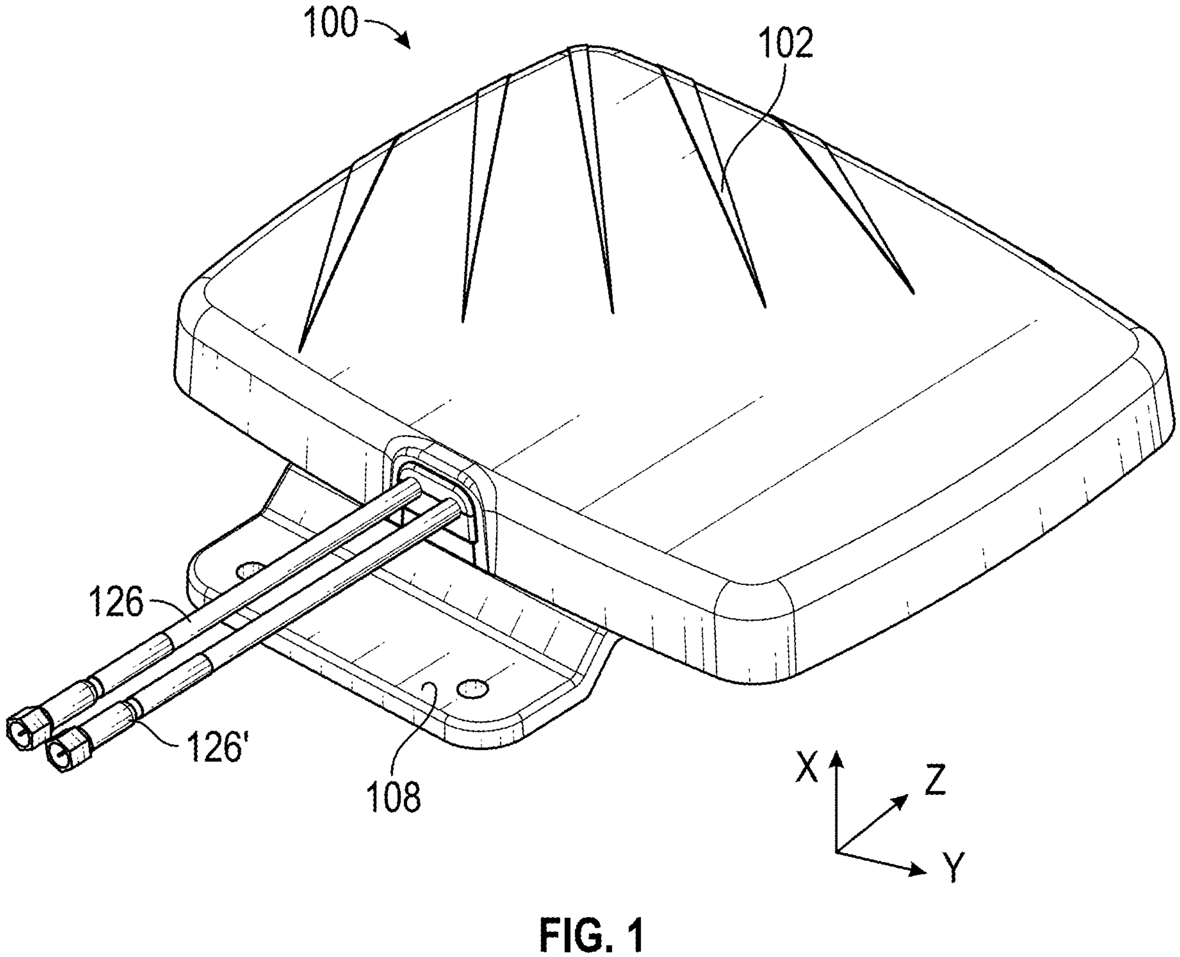
FIG. 1 illustrates a front perspective view of an antenna assembly, in accordance with some aspects of this disclosure.

While the implementations and method of the present application is susceptible to various modifications and alternative forms, specific implementations thereof have been shown by way of example in the drawings and are herein described in detail. It should be understood, however, that the description herein of specific implementations is not intended to limit the application to the particular implementation disclosed, but on the contrary, the intention is to cover all modifications, equivalents, and alternatives falling within the spirit and scope of the process of the present application as defined by the appended claims.

DETAILED DESCRIPTION

Illustrative implementations of the present disclosure are described below. In the interest of clarity, not all features of an actual implementation are described in this specification. It will of course be appreciated that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the implementations described herein may be oriented in any desired direction.

The system and method will be understood, both as to its structure and operation, from the accompanying drawings, taken in conjunction with the accompanying description. Several implementations of the system may be presented herein. It should be understood that various components, parts, and features of the different implementations may be combined together and/or interchanged with one another, all of which are within the scope of the present application, even though not all variations and particular implementations are shown in the drawings. It should also be understood that the mixing and matching of features, elements, and/or functions between various implementations is expressly contemplated herein so that one of ordinary skill in the art would appreciate from this disclosure that the features, elements, and/or functions of one implementation may be incorporated into another implementation as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary implementation, however, alternate implementations having scaled and proportional dimensions of the presented exemplary implementation are also considered. Additional features and functions are illustrated and discussed below.

2×2 MIMO Antenna Assembly

Figure 2A:
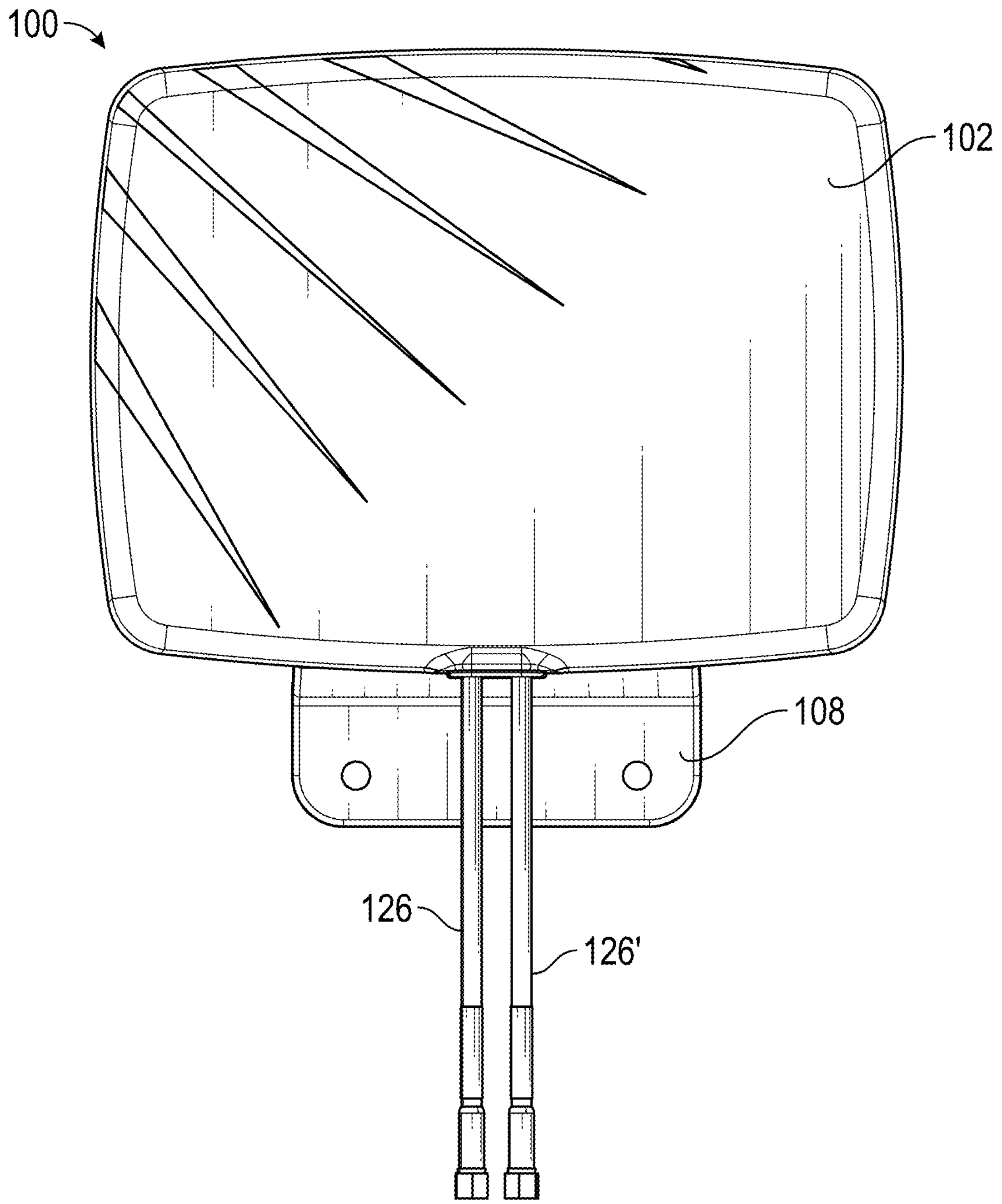
FIGS. 2A and 2B illustrate a front side view and a back side view respectively of the antenna assembly of FIG. 1, in accordance with some aspects of this disclosure.
Figure 2B:
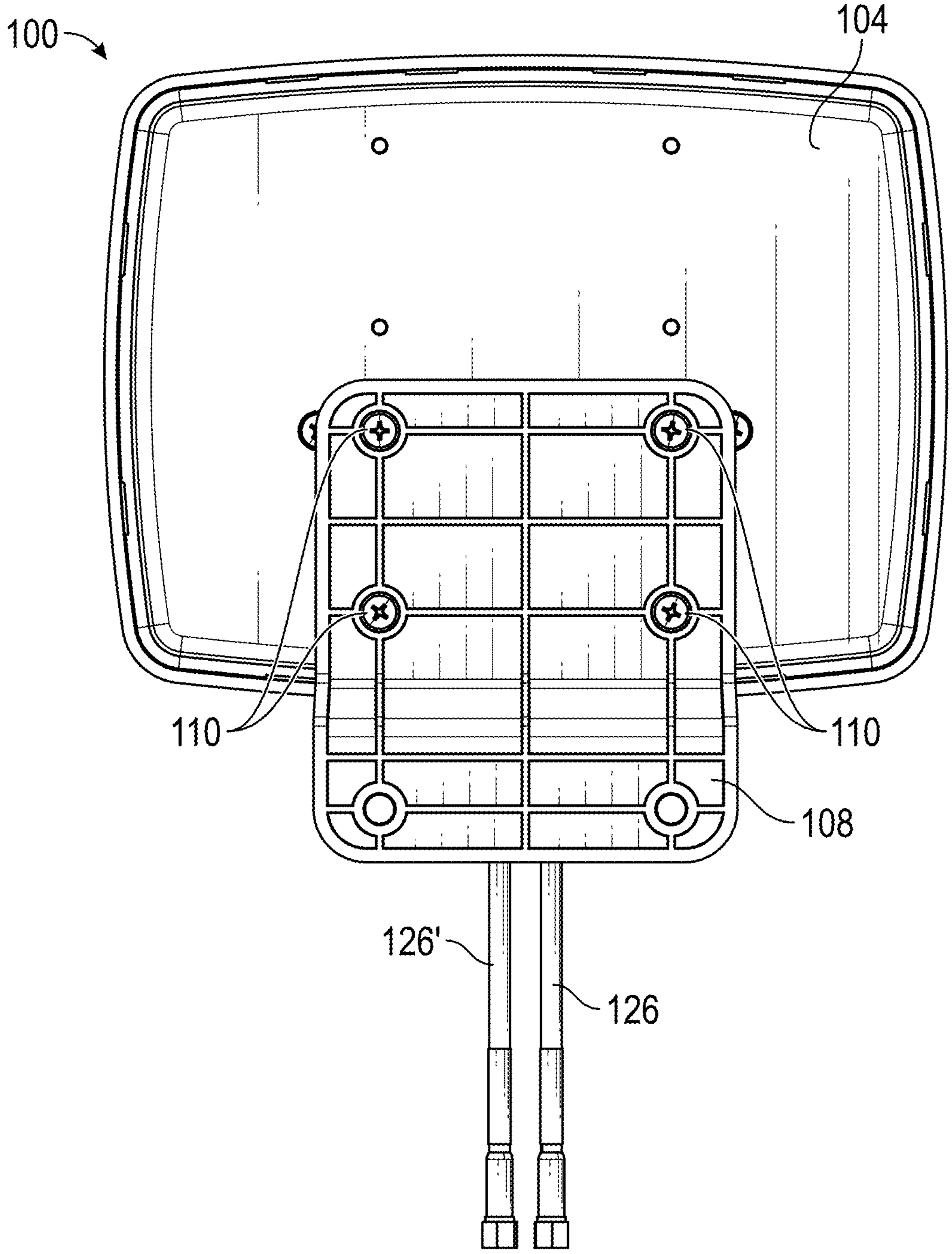
Figure 3A:
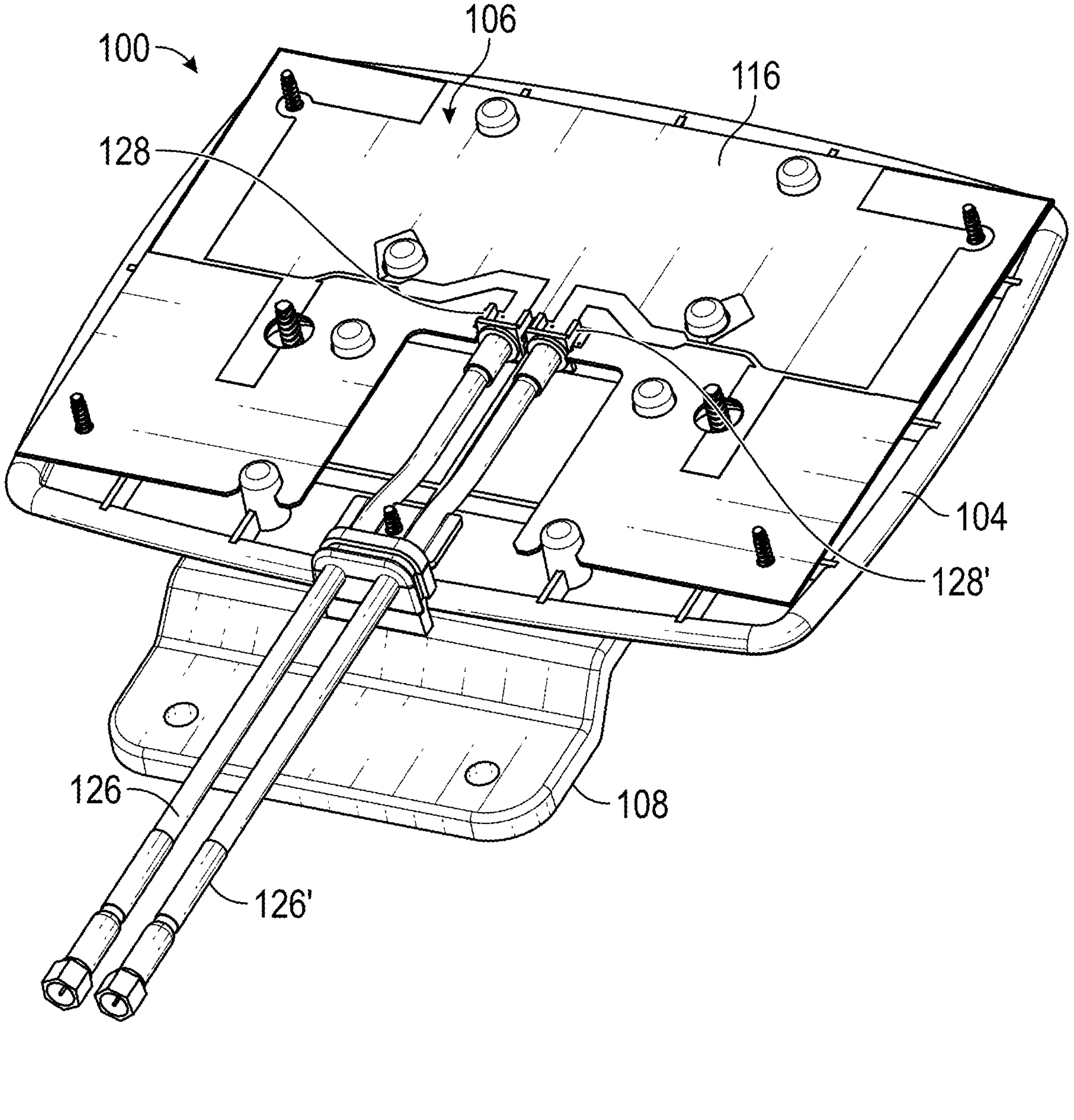
FIG. 3A illustrates a front perspective view of the antenna assembly of FIG. 1 with a front cover removed, in accordance with some aspects of this disclosure.
Figure 3B:
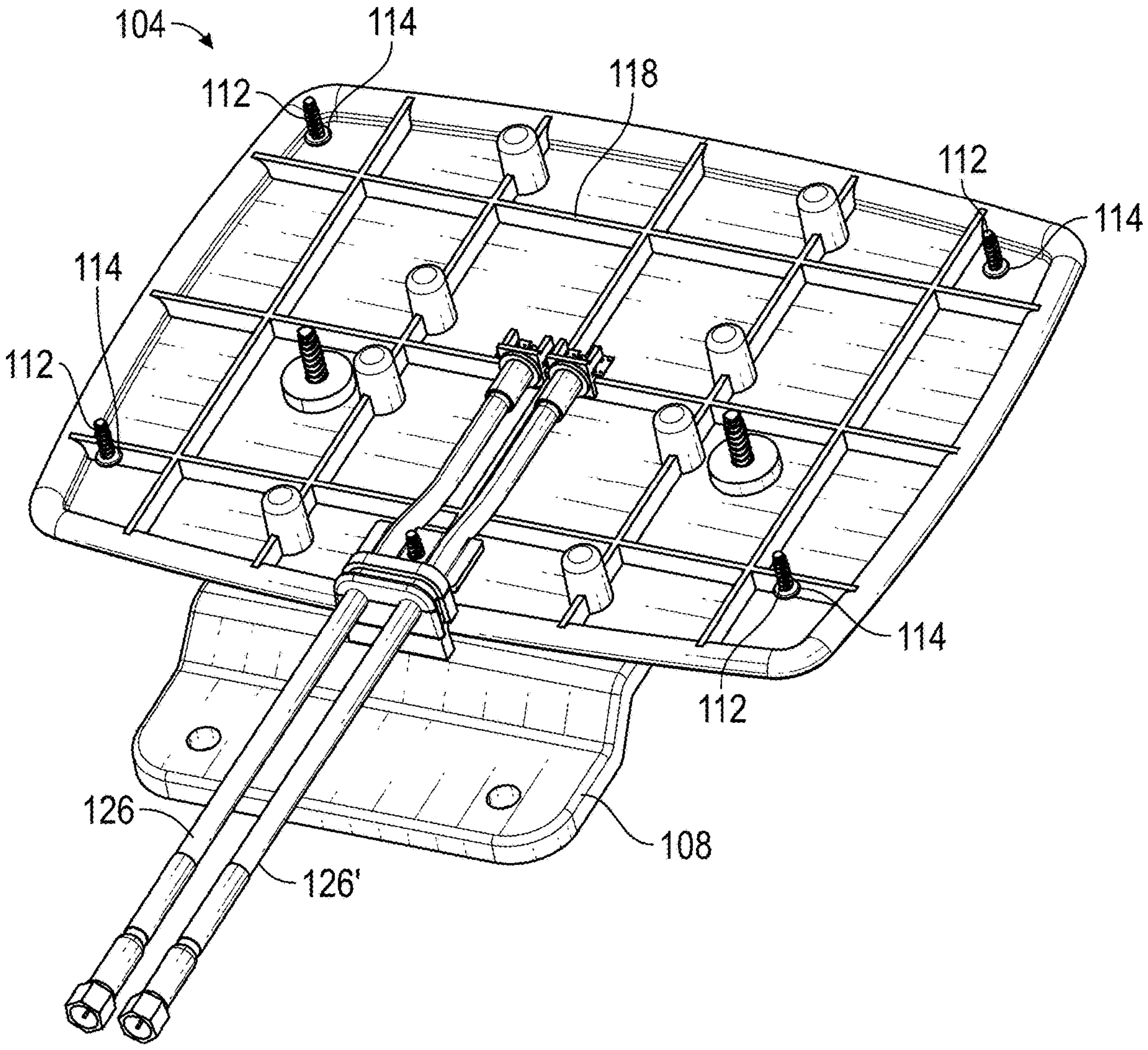
FIG. 3B illustrates a front perspective view of a back cover of the antenna assembly of FIG. 1, in accordance with some aspects of this disclosure.
Figure 4A:
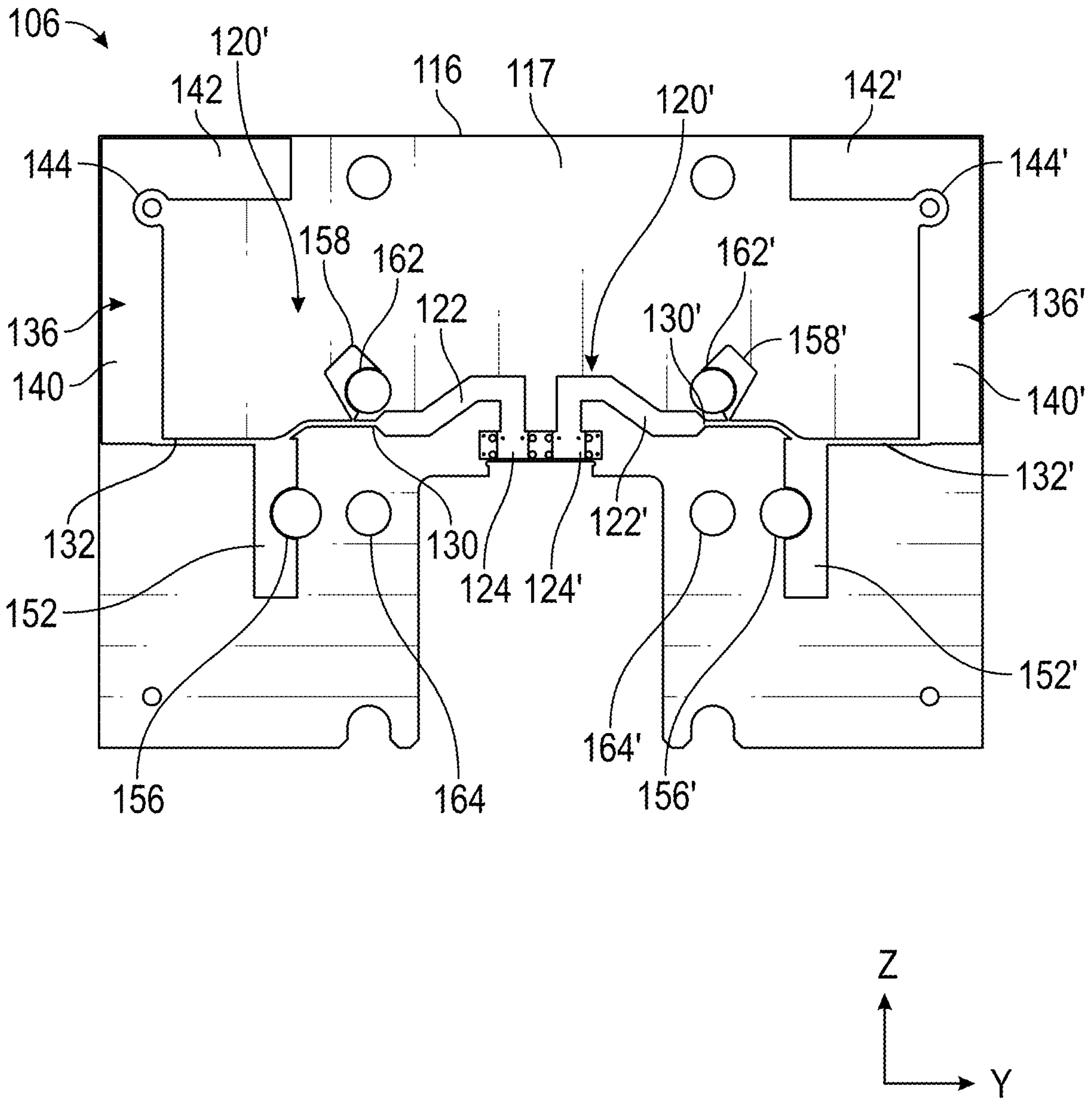
FIGS. 4A and 4B illustrate a top view and a bottom view respectively of one or more multiband antenna elements of the antenna assembly of FIG. 1, in accordance with some aspects of this disclosure.
Figure 4B:
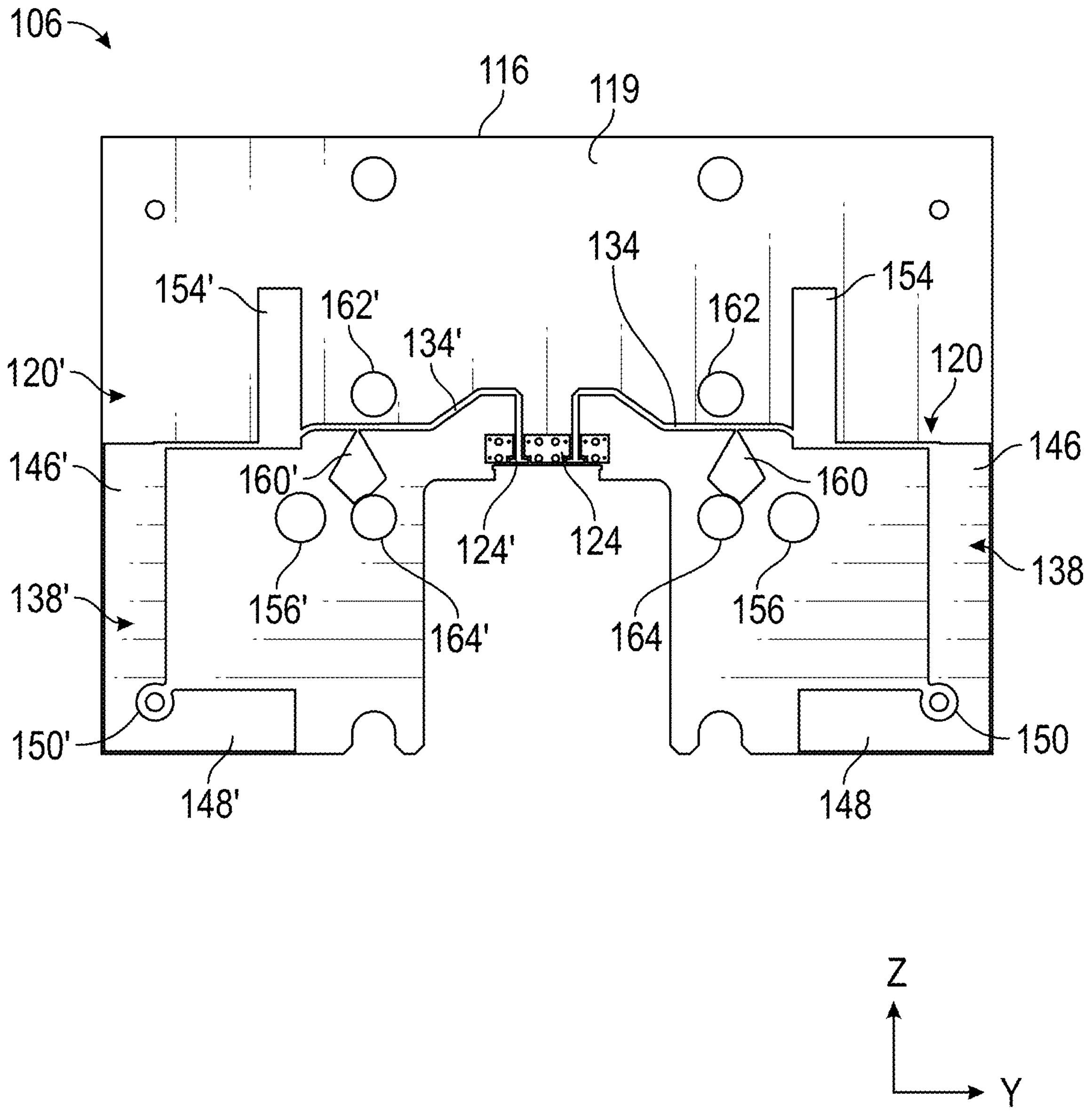

Referring now to the drawings wherein like reference characters identify corresponding or similar elements in form and function throughout the several views. FIG. 1 illustrates a front perspective view of an antenna assembly. FIGS. 2A and 2B illustrate a front side view and a back side view of the antenna assembly of FIG. 1 respectively. FIG. 3A illustrates a front perspective view of the antenna assembly of FIG. 1 with a front cover removed. FIG. 3B illustrates a front perspective view of a back cover of the antenna assembly of FIG. 1. FIGS. 4A and 4B illustrate a top view and a bottom view of one or more multiband antenna elements of the antenna assembly of FIG. 1.

According to some embodiments, features, and aspects of this disclosure, an antenna assembly is disclosed. The antenna assembly can include a front cover, a back cover, and a PCB base. The back cover can be configured to be coupled to the front cover, with the PCB base positioned between the front cover and the back cover. The antenna assembly can include a first multi-band antenna element formed on the PCB base and a second multi-band antenna element formed on the PCB base. The first multi-band antenna element can include a first ground plane, one or more first low-band radiating elements, one or more first mid-band radiating elements, and one or more first high-band radiating elements. The second multi-band antenna element can include a second ground plane, one or more second low-band radiating elements, one or more second mid-band radiating elements, and one or more second high-band radiating elements.

The following detailed description of certain implementations presents various descriptions of specific implementations. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain implementations can include more elements than illustrated in a drawing and/or a subset of the elements illustrated in a drawing. Further, some implementations can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIG. 1, a perspective front side view of an antenna assembly 100 is illustrated in accordance with an implementation of the present disclosure. The antenna assembly 100 may include a first/front cover 102, a second/back cover 104, and a multi-element multi-band antenna 106 (see e.g., FIGS. 4A and 4B). The antenna assembly 100 may be configured to provide wireless internet connectivity for a plurality of uses (e.g., data, voice communication, video, and/or the like). The antenna assembly 100 may be used in a wide range of applications. The antenna assembly 100 can be an omni-directional antenna to fixed modem locations for wireless last mile solutions. For example, the antenna assembly 100 can be used for data and voice communication. The antenna assembly 100 can be used as a 4G and/or 5G antenna. The antenna assembly 100 can be a 2×2 MIMO cellular, omni-directional antenna. In some cases, the antenna assembly 100 can be optimized for the C-band. In some implementations, the multi-element multi-band antenna 106 may have an operating frequency range of 500 MHz to 8.0 GHz. In some cases, the multi-element multi-band antenna 106 can have optimal performance when operating at a frequency range of 600 MHz to 4.0 GHz. In some cases, the multi-element multi-band antenna 106 can have optimal performance when operating at a frequency range of 600 MHz to 6.0 GHz. In other implementations, other operating frequency ranges are possible. In some cases, the antenna assembly 100 can be used in factory automation, IoT application, retail, enterprise, and/or the like. The antenna assembly 100 may have a smaller volume and profile when compared to other antenna systems. For example, in some implementations, the antenna assembly 100 may have a cubic volume of approximately 55 cubic inches or less.

FIG. 2A illustrates a front side view of the antenna assembly 100 and FIG. 2B illustrates a back side view of the 100. The antenna assembly 100 can include the front cover 102 and the back cover 104. The covers 102, 104 can protect and/or provide mechanical support for the internal components of the antenna assembly 100 (e.g., the multi-element multi-band antenna 106 discussed with reference to at least FIGS. 4A and 4B). For example, as discussed herein, the multi-element multi-band antenna 106 can be supported by the back cover 104 and enveloped by the front cover 102. In some implementations, the front cover 102 may be transparent to radiation from the multi-element multi-band antenna 106 and may serve as an environmental shield for the internal components of antenna assembly 100. One or both of the front cover 102 and back cover 104 can be made of non-conductive materials. For example, the covers 102, 104 may not be made of metal. In some examples, the covers 102, 104 can be made of plastic, fiberglass, carbon fiber, and/or the like materials that allow RF signals to pass through. The front cover 102 can be configured to be removably coupled to the back cover 104. The front cover 102 may be generally rectangularly shaped. In some cases, the front cover 102 can have rounded corners and/or sides. Similarly, the back cover 104 may be generally rectangularly shaped. In some cases, the back cover 104 can have rounded corners and/or sides. A top edge of the back cover 104 can be configured to interface with a bottom edge of the front cover 102. Other shapes are possible for the covers 102, 104.

According to some implementations of the antenna assembly 100, the front cover 102 and back cover 104 when coupled define an internal compact volume of less than about 100 cubic inches. In some implementations, the internal compact volume can be between about 20 cubic inches and between about 100 cubic inches, between about 30 cubic inches and between about 80 cubic inches, between about 40 cubic inches and between about 70 cubic inches, between about 45 cubic inches and between about 60 cubic inches, and/or between about 45 cubic inches and between about 55 cubic inches.

With reference to FIG. 2B, the back cover 104 can include one or more attachment portions 108. The attachment portions 108 can be used to mount the antenna assembly 100 to various locations. The type of the attachment portion 108 included in the antenna assembly 100 can vary based on the intended mounting manner and location. While one attachment portion 108 is shown, the antenna assembly 100 can include any number of attachment portions 108, depending on the use. In the illustrated example, the back cover 104 includes an attachment portion 108 that is shaped as a mounting plate. The attachment portion 108 can be coupled to the back side of the back cover 104 using any conventional fastening means. For example, as illustrated, the attachment portion 108 can be fixed to the back cover 104 using fasteners 110. The attachment portion 108 can be configured to allow the antenna assembly 100 to be mounted to various customer premise equipment (e.g., vehicles, buildings, indoor or outdoor equipment enclosures, and/or the like). For example, the attachment portion 108 could be used to fix the antenna assembly 100 to a wall. In another example, the attachment portion 108 could be used to fix the antenna assembly 100 to a poll (e.g., with a bracket). In other implementations, a different attachment portion 108 can be used in the antenna assembly 100. For example, the attachment portion 108 could be one or more worm gear clamps, similar to the attachment portions 208, 210 of the antenna assembly 200 discussed with reference to FIG. 6B.

In some embodiments, the antenna assembly 100 can be used with a client ground plane. In some cases, the attachment portion 108 can be used to attach the antenna assembly 100 to a client ground plane. The client ground plane may be in the form of conducting surfaces, such as on customer premise equipment. Those skilled in the art would understand that the nature of the deployment of the antenna assembly 100 will change slightly in the deployed performance based on type of structure the antenna assembly 100 is attached to as well as the surroundings in which it is deployed. In some implementations, the client ground plane is not required and may not form a portion of the antenna assembly 100.

As noted above, the back cover 104 forms the base of the antenna assembly 100. The back cover 104 provides mechanical support for the internal components of the antenna assembly 100. [0034] As shown in FIG. 1, the front cover 102 can be positioned on the back cover 104 to secure the internal components of the antenna assembly 100. The front cover 102 may include a plurality of front fastener holes (not shown), which may extend into the front cover 102. In some implementations, the front fastener holes may be tapered. In some implementations, the front fastener holes may be threaded. These plurality of front fastener holes may be aligned with back cover holes 112 of the back cover 104 in the assembled configuration, and fasteners 114 (see e.g., FIG. 3B) can be positioned within the front fastener holes and the back cover holes 112 to secure the front cover 102 and the internal components of the antenna assembly 100 to the back cover 104.

FIG. 3A illustrates a front perspective view of the antenna assembly 100 of FIG. 1 with the front cover 102 removed to further illustrate the internal component of the antenna assembly 100. The antenna assembly 100 can include one or more printed circuit board "PCB" bases 116 that support the multi-element multi-band antenna 106. In the illustrated example, the antenna assembly 100 includes one PCB base 116. The PCB base 116 can support the multi-element multi-band antenna 106. For example, the multi-element multi-band antenna 106 can be formed on the PCB base 116. The PCB base 116 can be housed within the antenna assembly 100 (e.g., between the front cover 102 and the back cover 104). In some cases, the PCB base 116 may be fiberglass reinforced with epoxy (e.g., FR4). The PCB base 116 may provide structure for the radiating elements/portions of the multi-element multi-band antenna 106. For example, the radiating elements/portions of the multi-element multi-band antenna 106 can be conductive material (e.g., copper) that can be etched into the structure of the PCB base 116.

FIG. 3B illustrates a front perspective view of the antenna assembly 100 of FIG. 1 with the front cover 102 and the PCB base 116 removed. As shown, the internal side of the back cover 104 can include internal ribbing structure 118. The PCB base 116 can be positioned on and supported by the internal ribbing structure 118. The internal ribbing structure 118 can provide separation between the multi-element multi-band antenna 106 and the back cover 104. Additionally, the structure of the front cover 102 and back cover 104 can provide electrical isolation between the fasteners (e.g., fasteners 114) and the electrically conductive surfaces of the PCB base 116.

FIGS. 4A and 4B illustrates a top side view and a bottom side view of the multi-element multi-band antenna 106 and PCB base 116. The multi-element multi-band antenna 106 can include one or more multiband antenna elements. In the illustrated example, the multi-element multi-band antenna 106 includes a first multiband antenna element 120 and a second multiband antenna element 120'. In the illustrated example, some portions of the multiband antenna elements 120, 120' are formed on a first/front side 117 of the PCB base 116 and some portions of the multiband antenna elements 120, 120' are formed on a second/back side 119 of the PCB base 116. In other implementations, the entire first multiband antenna element 120 and/or the entire second multiband antenna element 120' could be formed on either the front side 117 or the back side 119 of the PCB base 116.

The multi-element multi-band antenna 106 can include a first ground plane 122 (also referred to herein as the "first ground reference 122"). The first ground plane 122 may serve as the ground reference for at least the first multiband antenna element 120. The first ground plane 122 can be coupled to/extend from a first connection interface 124. The first connection interface 124 can be configured to connect the first multiband antenna element 120 to a ground connector of a first coaxial cable 126 (see e.g., FIG. 3A). For example, an edge connector 128 of the first coaxial cable 126 can be mechanically and/or electrically coupled to the first connection interface 124 (e.g., using solder). The multi-element multi-band antenna 106 can include a second ground plane 122' (also referred to herein as the "second ground reference 122'"). The second ground plane 122' may serve as the ground reference for at least the second multi-band antenna element 120'. The second ground plane 122' can be coupled to/extend from a second connection interface 124'. The second connection interface 124' can be configured to connect the second multiband antenna element 120' to a ground connector of a second coaxial cable 126' (see e.g., FIG. 3A). For example, an edge connector 128' of the second coaxial cable 126' can be mechanically and/or electrically coupled to the second connection interface 124' (e.g., using solder). Where the first multiband antenna element 120 and second multiband antenna element 120' are formed on both sides 117, 119 of the PCB base 116, the edge connectors 128, 128' may be soldered to both sides 117, 119 of the PCB base 116. For example, the first and second connection interfaces 124 can be formed on both sides 117, 119 of the PCB base 116. The ground planes 122, 122' may serve as a reference point for operation of the antenna assembly 100.

The multi-element multi-band antenna 106 can include a first feed point 130 and a first balun 132. The first feed point 130 can be coupled to the first ground plane 122 and the first balun 132. For example, the first feed point 130 can be the point where the electrical energy from the first coaxial cable 126 is transferred to the first balun 132. The multi-element multi-band antenna 106 can include a microstrip line 134 (also referred to herein as a "feed line 134") for the first multiband antenna element 120. The microstrip line 134 can be on the back side 119 of the PCB base 116. The center conductor of the first coaxial cable 126 can attach to the microstrip line 134. The first ground plane 122 can be the groundplane for the microstrip line 134. The first ground plane 122 and the microstrip line 134 can form the microstrip transmission line for the first multiband antenna element 120. With reference to FIG. 4B, the microstrip line 134 extends from/is coupled to the first connection interface 124. In this example, the first balun 132 extends to the radiating elements of the first multiband antenna element 120 on front side 117 of the PCB base 116 and the microstrip line 134 extends to the radiating elements of the first multiband antenna element 120 on the back side 119 of the PCB base 116. The two distinct conducting surface that form the microstrip transmission line (e.g., the microstrip line 134 and the first ground plane 122) can be used together to electrically excite the pairs of dipole arms that make up the first multiband antenna element 120, as explained herein. The impedance of the first feed point 130 can vary, depending on the application of the antenna assembly 100. In one example, the first feed point 130 can have an impedance of 50-ohms. As explained herein, the dipole arms of the first multiband antenna element 120 can have alternating polarity (e.g., alternating extension in the positive and negative Z-direction) to assist in the impedance matching and pattern construction of the multi-element multi-band antenna 106.

The tuning of the radiating elements of the first multiband antenna element 120 can be achieved by balancing a number of factors. These factors can include one or more of: the width of the balun 132, the microstrip line 134, the offset of the first balun 132 relative to the microstrip line 134 on the PCB base 116 (e.g., in the Z-direction), the spacing of the first balun 132 relative to the microstrip line 134 through the PCB base 116 (e.g., in the X-direction), the dielectric constant ("DK") of the PCB base 116, the geometry of the individual arms of the first multiband antenna element 120 and their spacing relative to each other, the feed impedance, the space from the first ground plane 122 for the feed transmission lines, and/or the like.

With continued reference to FIGS. 4A and 4B, the first multiband antenna element 120 can include a number of radiating elements/arms/dipole arms. For example, the first multiband antenna element 120 can include one or more high-band arms, one or more mid-band arms, and/or one or more low-band arms. In the illustrated embodiment, the first multiband antenna element 120 includes pairs of dipole arms for high-band, mid-band, and low-band radiation. As shown, in the illustrated example, the first multiband antenna element 120 can include a first low-band radiating element 136 and a second low-band radiating element 138 (also referred to herein as the first low-band arm 136 and the second low-band arm 138 respectively). The low-band arms 136, 138 can be configured for low band radiation (e.g., radiation less than approximately 1 GHz). The low-band arms 136, 138 can form a single dipole of the first multiband antenna element 120 (e.g., the driven element and is counterpoise). In the illustrated example, the first low-band radiating element 136 is formed on the front side 117 of the PCB base 116 and the second low-band radiating element 138 is formed on the back side 119 of the PCB base 116. However, this arrangement is not required, but can provide a convenient manner of reducing the number of plated through holes include in the PCB base 116. The first low-band radiating element 136 can be coupled to the first balun 132. The first low-band radiating element 136 can be L-shaped. For example, the first low-band radiating element 136 can include a first portion 140 and a second portion 142 where the second portion 142 is perpendicular to the first portion 140 (e.g., there can be an approximately 90-degree bend between the first portion 140 and second portion 142). The first balun 132 can be coupled to the first portion 140. The first portion 140 can extend in the positive Z-direction from the first balun 132. The first portion 140 and second portion 142 can be rectangularly shaped. In other implementations, the first low-band radiating element 136 can have a different shape. In some cases, the first low-band radiating element 136 can be positioned near one or more edges of the PCB base 116. For example, the first portion 140 can extend along a left-side edge of the PCB base 116 (e.g., in the positive Z-direction) and the second portion 142 can extend along a top-side edge of the PCB base 116 (e.g., in the positive Y-direction). This arrangement can reduce the size of the PCB base 116 required. In some cases, the first low-band radiating element 136 can include a cutout 144. The cutout 144 can be a portion of the first low-band radiating element 136 where the conductive material on the PCB base 116 is not present or has been removed. In some cases, a hole (e.g., for cover coupling purposes) extending through the PCB base 116 can be positioned in the cutout 144, however, this may not be related to the properties of the cutout 144. For example, a hole extending through the PCB base 116 is not required to achieve the desired effect of the cutout 144. The cutout 144 can be positioned at the joining of the first portion 140 and second portion 142. For example, the cutout 144 can be positioned at the 90-degree bend. The cutout 144 can have any suitable shape. For example, the cutout 144 can be circular, semi-circular, rectangular, and/or the like. In the illustrated example, the cutout 144 has a semi-circular shape. The cutout 144 can allow for a discontinuity in the current flow at higher frequencies. The cutout 144 can allow the first low-band radiating element 136 to assist with the radiation pattern shape at higher bands. In some cases, the cutout 144 can assist with the impedance match as well. For example, the current crowding at higher order modes for the low band dipole (e.g., the first low-band radiating element 136 and second low-band radiating element 138) allows for additional resonances that are beneficial for the operation of the entire radiating structure of the first multiband antenna element 120 at the higher bands.

The second low-band radiating element 138 can be coupled to the microstrip line 134. The second low-band radiating element 138 can be L-shaped. For example, the second low-band radiating element 138 can include a first portion 146 and a second portion 148 where the second portion 148 is perpendicular to the first portion 146 (e.g., there can be an approximately 90-degree bend between the first portion 146 and second portion 148). The microstrip line 134 can be coupled to the first portion 146. The first portion 146 can extend in the negative Z-direction from the first balun 132. The first portion 146 and second portion 148 can be rectangularly shaped. In other implementations, the second low-band radiating element 138 can have a different shape. In some cases, the second low-band radiating element 138 can be positioned near one or more edges of the PCB base 116. For example, the first portion 146 can extend along a left-side edge of the PCB base 116 (e.g., in the negative Z-direction) and the second portion 148 can extend along a bottom-side edge of the PCB base 116 (e.g., in the positive Y-direction). As such, the first low-band radiating element 136 can be a mirror image of the second low-band radiating element 138. The combination of the first low-band radiating element 136 and second low-band radiating element 138 can be C-shaped. In some cases, the second low-band radiating element 138 can include a cutout 150. In some cases, a hole (e.g., for cover coupling purposes) extending through the PCB base 116 can be positioned in the cutout 150, however, this may not be related to the properties of the cutout 150. For example, a hole extending through the PCB base 116 is not required to achieve the desired effect of the cutout 150. The cutout 150 can be positioned at the joining of the first portion 146 and second portion 148. For example, the cutout 150 can be positioned at the 90-degree bend. The cutout 150 can have any suitable shape. For example, the cutout 150 can be circular, semi-circular, rectangular, and/or the like. In the illustrated example, the cutout 150 has a semi-circular shape. The cutout 150 can allow for a discontinuity in the current flow at higher frequencies. The cutout 150 can allow the second low-band radiating element 138 to assist with the radiation pattern shape at higher bands. In some cases, the cutout 150 can assist with the impedance match as well. For example, the current crowding at higher order modes for the low band dipole (e.g., the first low-band radiating element 136 and second low-band radiating element 138) allows for additional resonances that are beneficial for the operation of the entire radiating structure of the first multiband antenna element 120 at the higher bands.

The first multiband antenna element 120 can include one or more mid-band radiating elements/arms/dipole arms. In the illustrated example, the first multiband antenna element 120 can include a first mid-band radiating element 152 and a second mid-band radiating element 154 (also referred to herein as the first mid-band arm 152 and the second mid-band arm 154 respectively). The mid-band arms 152, 154 can be configured for mid band radiation (e.g., radiation approximately between 1700 MHz to 2700 MHz). The mid-band arms 152, 154 can form a single dipole of the first multiband antenna element 120 (e.g., the driven element and is counterpoise). The first mid-band radiating element 152 and the second mid-band radiating element 154 can be formed on either side of the PCB base 116. In the illustrated example, the first mid-band radiating element 152 is formed on the front side 117 of the PCB base 116 and the second mid-band radiating element 154 is formed on the back side 119 of the PCB base 116. In this arrangement, the midband arms 152, 154 are transposed in orientation compared to the low-band arms 136, 138. As noted herein, this arrangement can assist with the impedance matching and forming of the radiating pattern in the first multiband antenna element 120. For example, on the front side 117 of the PCB base 116, the first low-band radiating element 136 extends in the positive Z-direction and the first mid-band radiating element 152 extends in the negative Z-direction. Similarly, the second low-band radiating element 138 extends in the negative Z-direction and the second mid-band radiating element 154 extends in the positive Z-direction. The first mid-band radiating element 152 can be coupled to the first balun 132. The first mid-band radiating element 152 can extend in the negative Z-direction from the first balun 132. The second mid-band radiating element 154 can be coupled to the microstrip line 134. The second mid-band radiating element 154 can extend in the positive Z-direction from the microstrip line 134. As such, the second mid-band radiating element 154 can be a mirror image of the first mid-band radiating element 152. The mid-band radiating elements 152, 154 can be rectangularly shaped. In other implementations, the mid-band radiating elements 152, 154 can be shaped differently. In some cases, one or more holes can extend through one or both of the mid-band arms 152, 154. For example, as shown, a first hole 156 extends through the PCB base 116 and the first mid-band radiating element 152. The first hole 156 can allow fasteners or other mechanical components of the antenna assembly 100 to extend through the PCB base 116 (e.g., for securing the front cover 102 to the back cover 104). The first hole 156 is not required and some implementations of the antenna assembly 100 will not include the first hole 156 or the first hole 156 will not extend through the first mid-band radiating element 152.

The first multiband antenna element 120 can include one or more high-band radiating elements/arms/dipole arms. In the illustrated example, the first multiband antenna element 120 can include a first high-band radiating element 158 and a second high-band radiating element 160 (also referred to herein as the first high-band arm 158 and the second high-band arm 160 respectively). The high-band arms 158, 160 can be configured for high band radiation (e.g., radiation approximately above 2700 MHz). The high-band arms 158, 160 can form a single dipole of the first multiband antenna element 120 (e.g., the driven element and is counterpoise). The first high-band radiating element 158 and the second high-band radiating element 160 can be formed on either side of the PCB base 116. In the illustrated example, the first high-band radiating element 158 is formed on the front side 117 of the PCB base 116 and the second high-band radiating element 160 is formed on the back side 119 of the PCB base 116. In this arrangement, the high-band arms 158, 160 are transposed in orientation compared to the mid-band arms 152, 154. For example, on the front side 117 of the PCB base 116, the first high-band radiating element 158 extends in the positive Z-direction (e.g., in the same direction as the first low-band radiating element 136) and the first mid-band radiating element 152 extends in the negative Z-direction. Similarly, the second high-band radiating element 160 extends in the negative Z-direction (e.g., in the same direction as the second low-band radiating element 138) and the second mid-band radiating element 154 extends in the positive Z-direction. The first high-band radiating element 158 can be coupled to the first balun 132. The first high-band radiating element 158 can extend in the positive Z-direction from the first balun 132. The second high-band radiating element 160 can be coupled to the microstrip line 134. The second high-band radiating element 160 can extend in the negative Z-direction from the microstrip line 134. As such, the second high-band radiating element 160 can be a mirror image of the first high-band radiating element 158. The high-band radiating elements 158, 160 can be diamond/bi-cone shaped. In other implementations, the high-band radiating elements 158, 160 can have different shapes. In some cases, having a bi-cone shape of the high-band radiating elements 158, 160 can improve the impedance bandwidth at the upper end of the frequency band for the high-band radiating elements 158, 160. In some cases, one or more holes can extend through one or more of the high-band arms 158, 160. For example, as shown, a second hole 162 extends through the PCB base 116 and the first high-band radiating element 158. Similarly, a third hole 164 extends through the PCB base 116 and the second high-band radiating element 160. Like the first hole 156, the second hole 162 and third hole 164 can allow fasteners or other mechanical components of the antenna assembly 100 to extend through the PCB base 116 (e.g., for securing the front cover 102 to the back cover 104). The second hole 162 and third hole 164 are not required and some implementations of the antenna assembly 100 will not include the second and third holes 162, 164 or the second and third holes 162, 164 will not extend through the radiating elements of the first multiband antenna element 120.

In some cases, the high-band arms 158, 160 can be the closest to the center of the PCB base 116 and the first connection interface 124. Moving in the negative Y-direction from the first connection interface 124, the first multiband antenna element 120 can be arranged such that the low-band arms 136, 138 are positioned furthest from the first connection interface 124 in the Y-direction and the high-band arms 158, 160 are the closest to the first connection interface 124, with the mid-band arms 152, 154 between the high-band arms 158, 160 and the low-band arms 136, 138 in the Y-direction.

As noted herein, the multi-element multi-band antenna 106 can include a first multiband antenna element 120 and a second multiband antenna element 120' formed on the PCB base 116. Some features of the second multiband antenna element 120' are similar or identical to feature of the first multiband antenna element 120 in at least FIGS. 4A and 4B. Thus, reference numerals used to designate the various features or components of the first multiband antenna element 120 are identical to those used for identifying the corresponding features or components of the second multiband antenna element 120' in at least FIGS. 4A and 4B, except that the numerical identifiers for the second multiband antenna element 120' include a “prime”. Therefore, the structure and description for the various features of the first multiband antenna element 120 and the operation thereof as described in at least FIGS. 4A and 4B are understood to apply to the corresponding features of the second multiband antenna element 120', except as described differently below.

The second multiband antenna element 120' differs from the first multiband antenna element 120 in the position and orientation on the PCB base 116. In some implementations, the second multiband antenna element 120' can be a mirror image of the first multiband antenna element 120 based on a centerline extending in the Z-direction between the first connection interface 124 and the second connection interface 124'. For example, the second portion 142' of the first low-band radiating element 136' of the second multiband antenna element 120' can extend from the first portion 140' in the negative Y-direction. Similarly, second portion 148' of the second low-band radiating element 138' of the second multiband antenna element 120' can extend from the first portion 146' in the negative Y-direction.

In some implementations, the first multiband antenna element 120 and the second multiband antenna element 120' may be formed primarily or entirely on the one side of the PCB base 116 (e.g., the front side 117). However, having the multiband antenna elements 120, 120' formed on both sides of the PCB base 116 can provide certain benefits. For example, this arrangement can reduce the complexity of the design. For example, the complexity of the baluns 132, 132' and microstrip lines 134, 134' can be reduced such that no crossing of lines occurs in the multiband antenna elements 120, 120'. In another example, having the multiband antenna elements 120, 120' on both sides of the PCB base 116 can provide a benefits of allowing the overall size of the antenna assembly 100 to be reduced. For example, when the multi-band antenna elements 120, 120' are formed on one side of the PCB base 116, the size of the PCB base 116 may need to be increased, which can cause the overall size of the antenna assembly 100 to increase. Compact antennas are desirable, as such, an antenna assembly 100 with a smaller volumetric profile is often desirable. Additionally, having the multiband antenna elements 120, 120' on both sides of the PCB base 116 can reduce the complexity of the balun.

In some implementations, the antenna assembly 100 can be optimized for the C-Band, which can span approximately 4.0 GHz to 8.0 GHz. For example, when operating on a 5G cellular network, optimizing the antenna assembly 100 for the C-band can provide a balance between high data speeds and quality coverage. For example, in some cases, the C-band can provide a compromise between higher frequencies used for ultra-fast data transfer (e.g., millimeter-wave bands) and lower frequencies used for broader coverage (e.g., sub-6 GHz bands) in 5G networks. According to some implementations, references to C-band can span from approximately 3.4 GHz to approximately 4.2 GHz. According to some implementations, references to LAA can span from approximately 5 GHz to approximately 7 GHz.

4×4 MIMO Antenna Assembly

Figure 5:
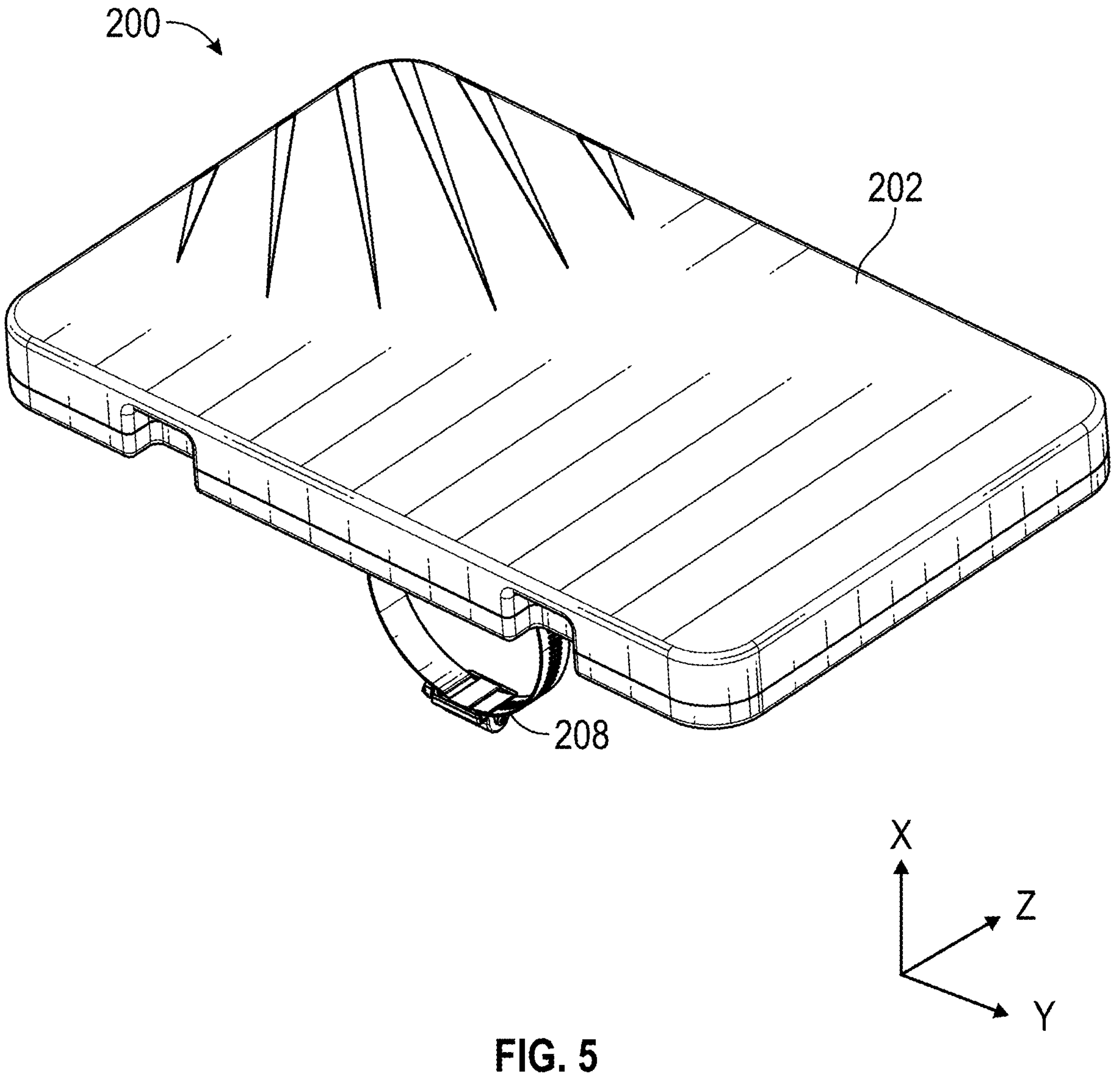
FIG. 5 illustrates a front perspective view of an antenna assembly, in accordance with some aspects of this disclosure.
Figure 6A:
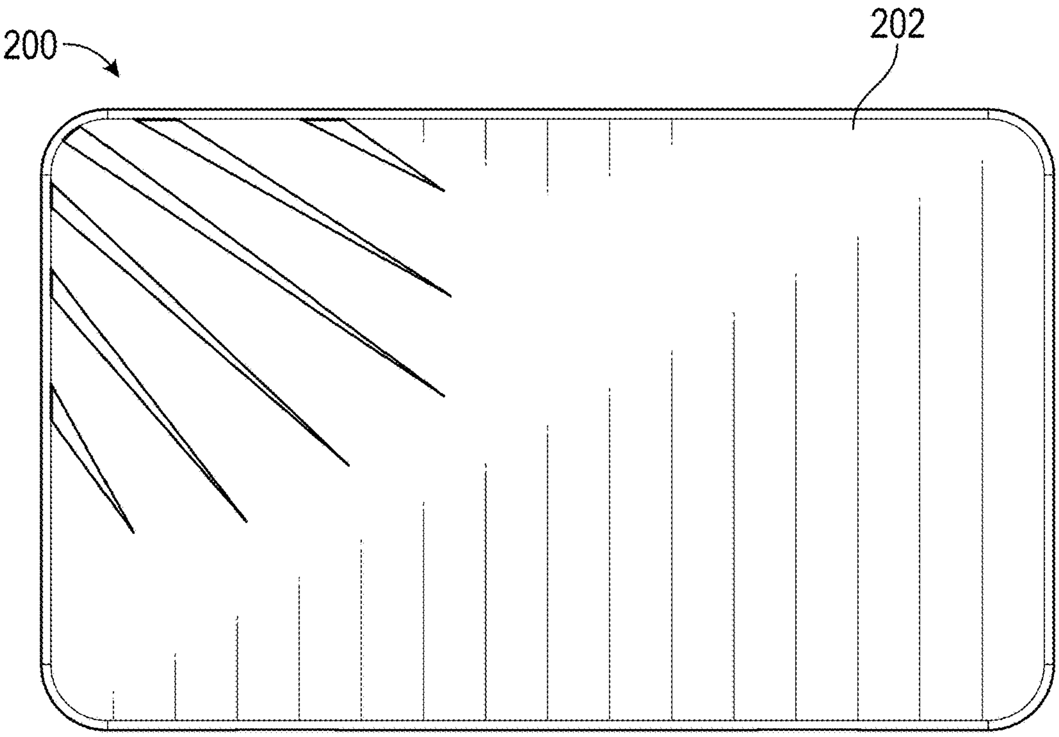
FIGS. 6A and 6B illustrate a front side view and a back side view respectively of the antenna assembly of FIG. 5, in accordance with some aspects of this disclosure.
Figure 6B:
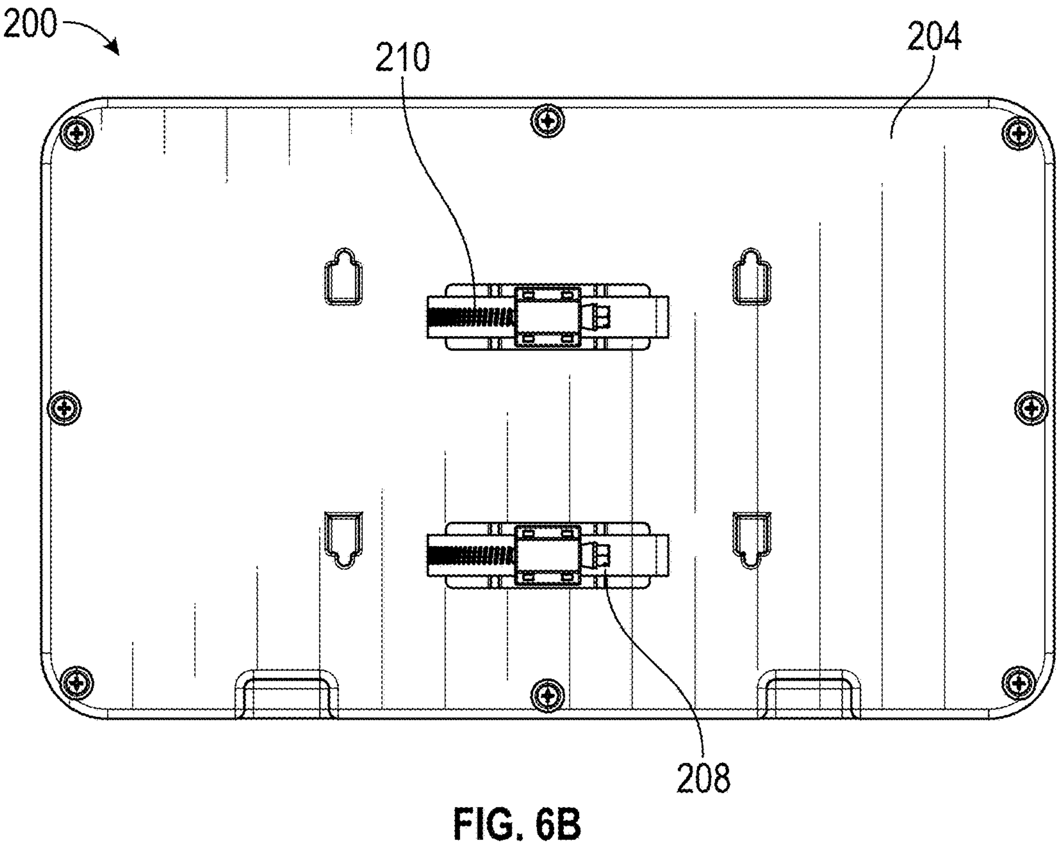
Figure 7A:
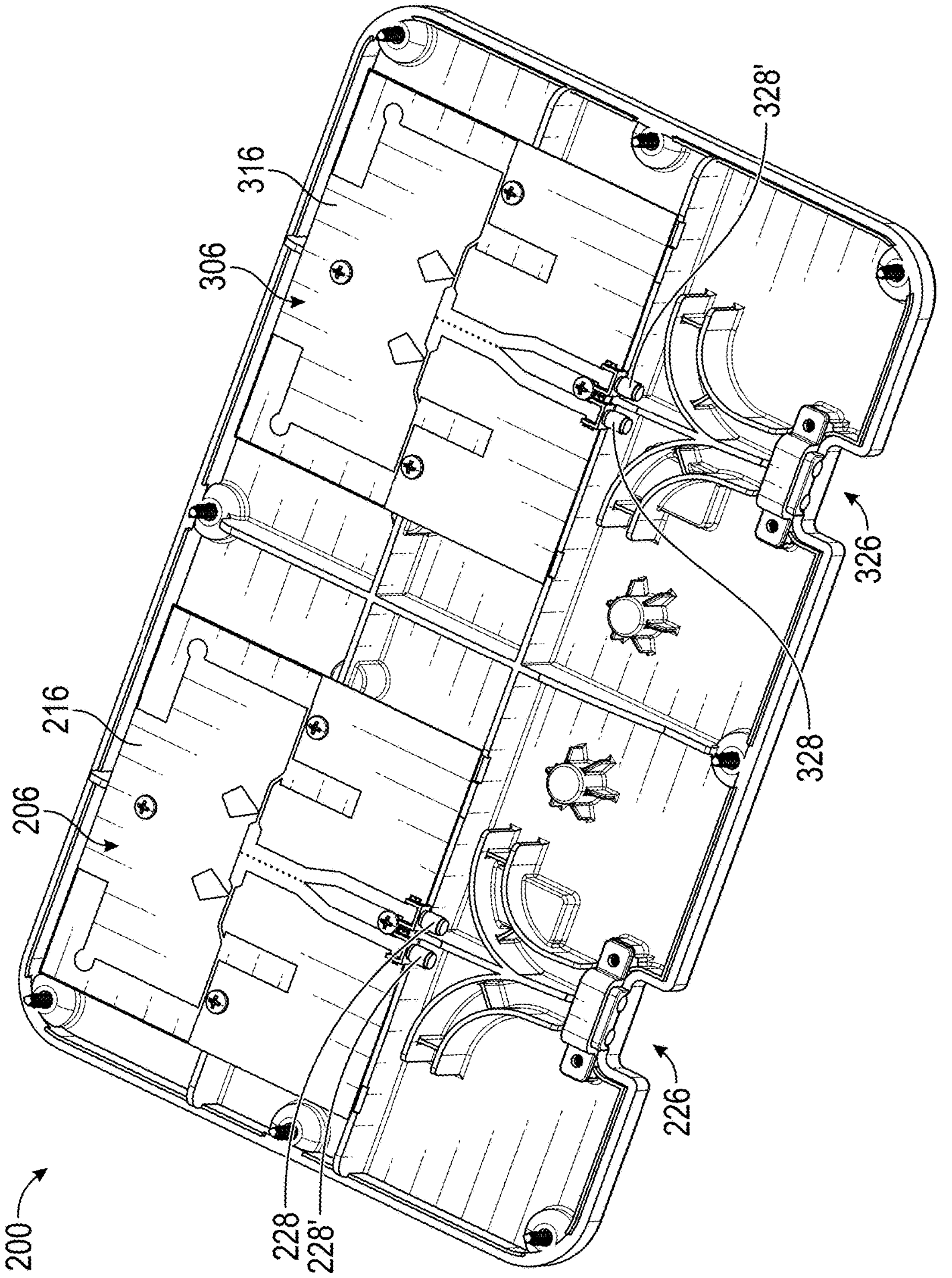
FIG. 7A illustrates a front perspective view of the antenna assembly of FIG. 5 with a front cover removed, in accordance with some aspects of this disclosure.
Figure 7B:
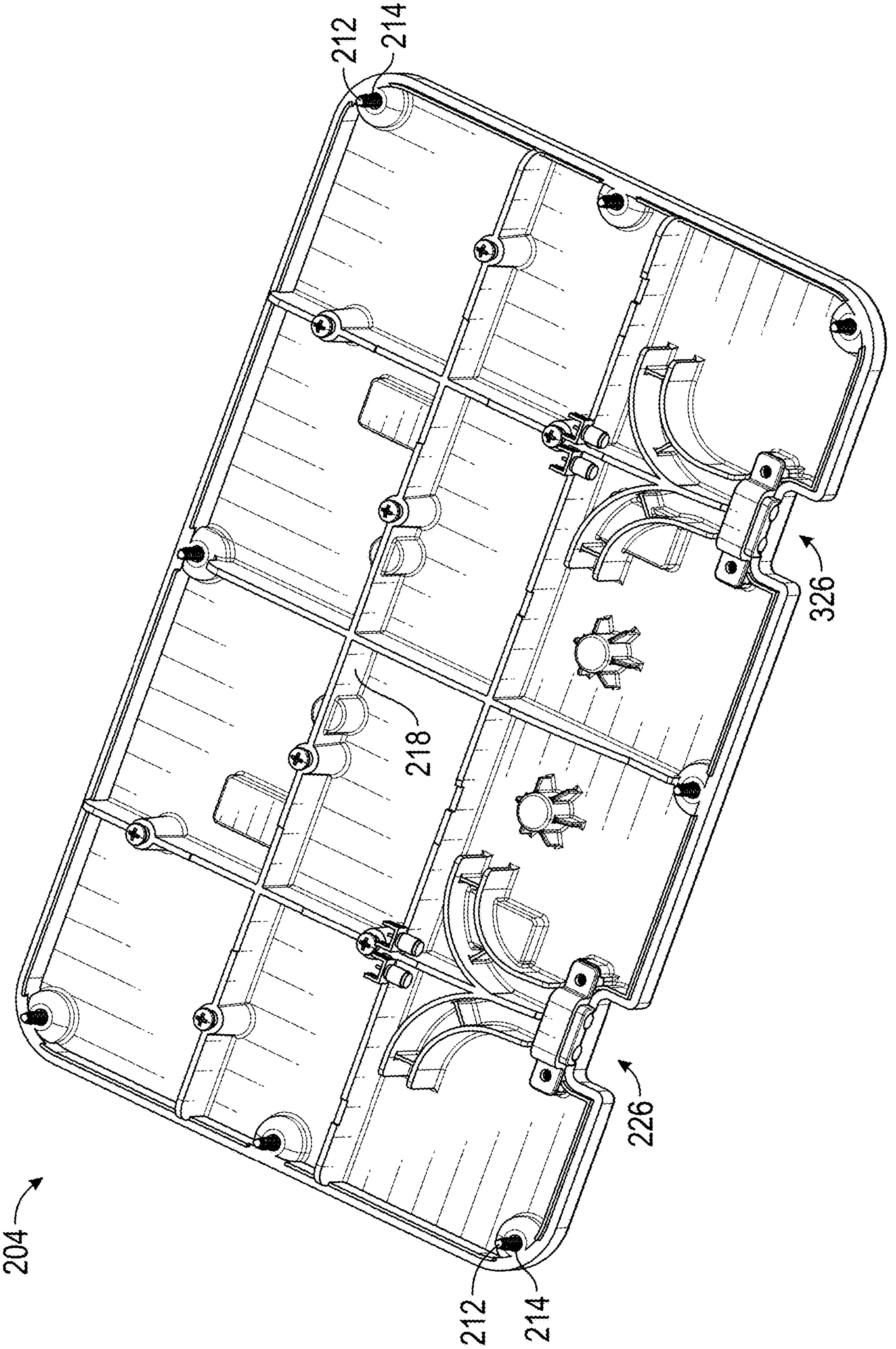
FIG. 7B illustrates a front perspective view of a back cover of the antenna assembly of FIG. 5, in accordance with some aspects of this disclosure.
Figure 8A:
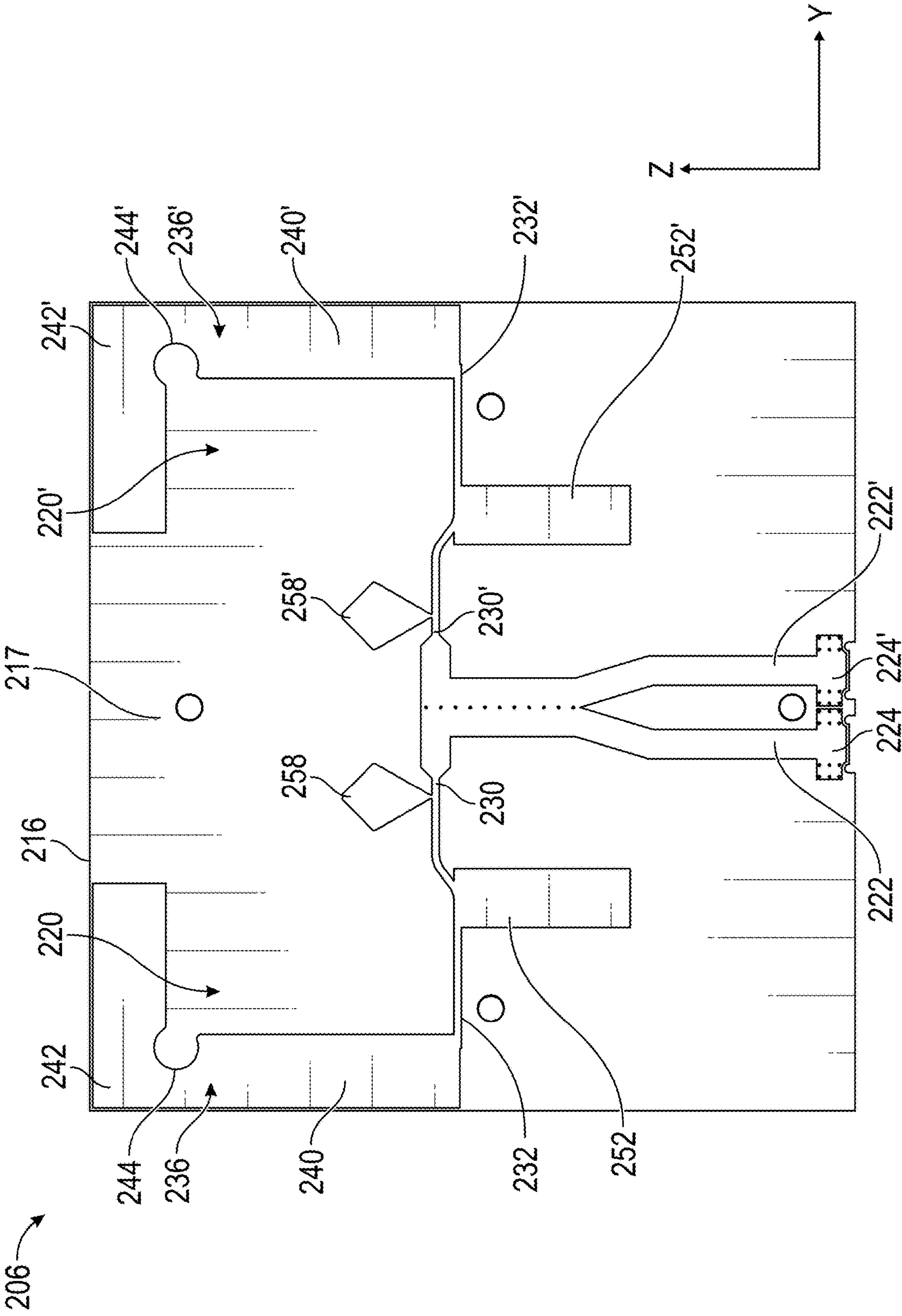
FIGS. 8A and 8B illustrate a top view and a bottom view respectively of one or more multiband antenna elements of the antenna assembly of FIG. 5, in accordance with some aspects of this disclosure.
Figure 8B:
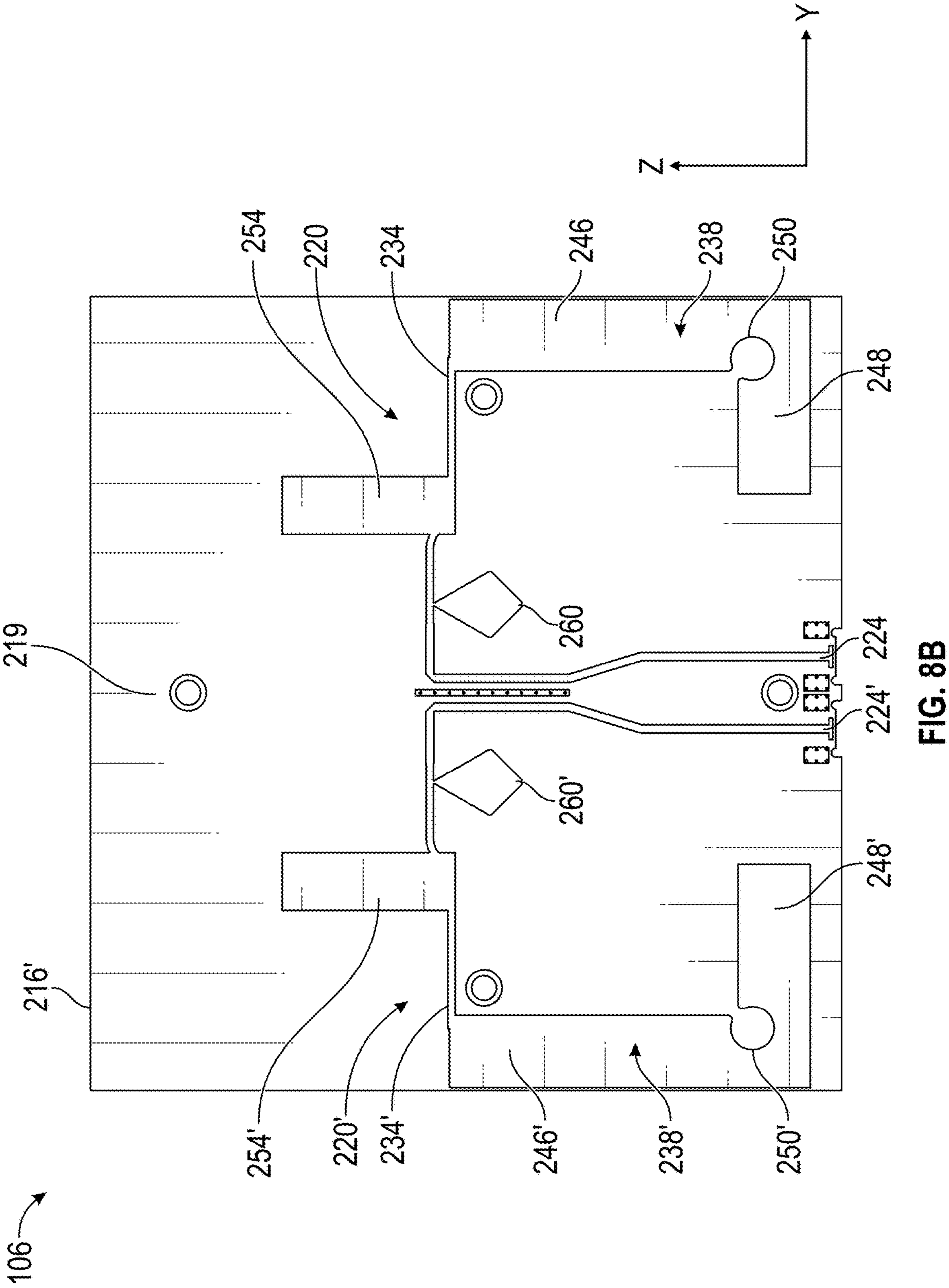

Referring now to the drawings of FIG. 5-8B, wherein like reference characters identify corresponding or similar elements in form and function throughout the several views. FIG. 5 illustrates a front perspective view of an antenna assembly. FIGS. 6A and 6B illustrate a front side view and a back side view respectively of the antenna assembly of FIG. 5. FIG. 7A illustrates a front perspective view of the antenna assembly of FIG. 5 with a front cover removed. FIG. 7B illustrates a front perspective view of a back cover of the antenna assembly of FIG. 5. FIGS. 8A and 8B illustrate a top view and a bottom view respectively of one or more multiband antenna elements of the antenna assembly of FIG. 5.

According to some embodiments, features, and aspects of this disclosure, an antenna assembly is disclosed. The antenna assembly can include a front cover, a back cover, a PCB first PCB base and a second PCB base. The back cover can be configured to be coupled to the front cover, with the first PCB base adjacent to the second PCB base and the first and second PCB bases positioned between the front cover and the back cover. The antenna assembly can include a first multi-band antenna element formed on the first PCB base and a second multi-band antenna element formed on the first PCB base. The antenna assembly can include a third multi-band antenna element formed on the second PCB base and a fourth multi-band antenna element formed on the second PCB base.

The following detailed description of certain implementations presents various descriptions of specific implementations. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain implementations can include more elements than illustrated in a drawing and/or a subset of the elements illustrated in a drawing. Further, some implementations can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIG. 5, a perspective front side view of an antenna assembly 200 is illustrated in accordance with an implementation of the present disclosure. The antenna assembly 200 may include a first/front cover 202, a second/back cover 204, a first multi-element multi-band antenna 206 (see e.g., FIG. 7A), and a second multi-element multi-band antenna 306 (see e.g., FIG. 7A). The antenna assembly 200 may be configured to provide wireless internet connectivity for a plurality of uses (e.g., data, voice communication, video and/or the like). The antenna assembly 200 may be used in a wide range of applications. The antenna assembly 200 can be an omni-directional antenna to fixed modem locations for wireless last mile solutions. For example, the antenna assembly 200 can be used for data and voice communication. The antenna assembly 200 can be used as a 4G and/or 5G antenna. The antenna assembly 200 can be a 4×4 MIMO cellular, omni-directional antenna. In some cases, the antenna assembly 200 can be optimized for the C-band.

The antenna assembly 200 can be similar to the antenna assembly 100. However, the antenna assembly 200 can include multiple multi-element multi-band antennas (e.g., the first multi-element multi-band antenna 206 and the second multi-element multi-band antenna 306), which can provide certain benefits. For example, in some cases, having multiple multi-element multi-band antennas can allow the C-band frequency to reach further distances to achieve a higher gain, as compared to the antenna assembly 100 with a single multi-element multi-band antenna 106.

In some implementations, the multi-element multi-band antennas 206, 306 may have an operating frequency range of 500 MHz to 8.0 GHz. In some cases, the multi-element multi-band antennas 206, 306 can have optimal performance when operating at a frequency range of 600 MHz to 4.0 GHz. In some cases, the multi-element multi-band antennas 206, 306 can have optimal performance when operating at a frequency range of 600 MHz to 6.0 GHz. In other implementations, other operating frequency ranges are possible. In some cases, the antenna assembly 200 can be used in enterprise network investing in high-capacity throughput and high data speeds. In other examples, the antenna assembly 200 can be used in and perform with high efficiency for campus, enterprise, retail, warehouse, and/or the like applications. The antenna assembly 200 may have a smaller volume and profile when compared to other antenna systems. For example, in some implementations, the antenna assembly 200 may have a cubic volume of approximately 207 cubic inches or less.

FIG. 6A illustrates a front side view of the antenna assembly 200 and FIG. 6B illustrates a back side view of the 200. The antenna assembly 200 can include the front cover 202 and the back cover 204. The covers 202, 204 can protect and/or provide mechanical support for the internal components of the antenna assembly 200 (e.g., the multi-element multi-band antennas 206, 306 discussed with reference to at least FIGS. 8A and 8B). For example, as discussed herein, the multi-element multi-band antennas 206, 306 can be supported by the back cover 204 and enveloped by the front cover 202. In some implementations, the front cover 202 may be transparent to radiation from the multi-element multi-band antennas 206, 306 and may serve as an environmental shield for the internal components of antenna assembly 200. One or both of the front cover 202 and back cover 204 can be made of non-conductive materials. For example, the covers 202, 204 may not be made of metal. In some examples, the covers 202, 204 can be made of plastic, fiberglass, carbon fiber, and/or the like materials that allow RF signals to pass through. The front cover 202 can be configured to be removably coupled to the back cover 204. The front cover 202 may be generally rectangularly shaped. In some cases, the front cover 202 can have rounded corners and/or sides. Similarly, the back cover 204 may be generally rectangularly shaped. In some cases, the back cover 204 can have rounded corners and/or sides. A top edge of the back cover 204 can be configured to interface with a bottom edge of the front cover 202. Other shapes are possible for the covers 202, 204.

According to some implementations of the antenna assembly 200, the front cover 202 and back cover 204 when coupled define an internal compact volume of less than about 400 cubic inches. In some implementations, the internal compact volume can be between about 100 cubic inches and between about 400 cubic inches, between about 125 cubic inches and between about 350 cubic inches, between about 150 cubic inches and between about 300 cubic inches, between about 175 cubic inches and between about 250 cubic inches, and/or between about 175 cubic inches and between about 225 cubic inches.

With reference to FIG. 6B, the back cover 204 can include one or more attachment portions. In the illustrated example, the antenna assembly 200 includes a first attachment portion 208 and a second attachment portion 210. The attachment portions 208, 210 can be used to mount the antenna assembly 200 to various locations. The type of the attachment portions 208, 210 included in the antenna assembly 200 can vary based on the intended mounting manner and location. While two attachment portions 208, 210 are shown, the antenna assembly 200 can include any number of attachment portions 208, 210, depending on the use. In the illustrated example, the back cover 204 includes attachment portions 208, 210 that are shaped as worm clamp gears. The attachment portions 208, 210 can be coupled to the back side of the back cover 204 using any conventional fastening means. The attachment portions 208, 210 can be configured to allow the antenna assembly 200 to be mounted to various customer premise equipment (e.g., vehicles, buildings, indoor or outdoor equipment enclosures, and/or the like). For example, the attachment portion 208 could be used to fix the antenna assembly 200 to a wall. In another example, the attachment portion 208 could be used to fix the antenna assembly 200 to a poll. In other implementations, a different attachment portion 208 can be used in the antenna assembly 200. For example, the attachment portions 208, 210 could be one or more mounting plates, similar to the attachment portion 108 of the antenna assembly 100 discussed with reference to FIG. 2B.

In some embodiments, the antenna assembly 200 can be used with a client ground plane. In some cases, the attachment portion 208 can be used to attach the antenna assembly 200 to a client ground plane. The client ground plane may be in the form of conducting surfaces, such as on customer premise equipment. Those skilled in the art would understand that the nature of the deployment of the antenna assembly 200 will change slightly in the deployed performance based on type of structure the antenna assembly 200 is attached to as well as the surroundings in which it is deployed. In some implementations, the client ground plane is not required and may not form a portion of the antenna assembly 200.

As noted above, the back cover 204 forms the base of the antenna assembly 200. The back cover 204 provides mechanical support for the internal components of the antenna assembly 200. [0062] As shown in FIG. 5, the front cover 202 can be positioned on the back cover 204 to secure the internal components of the antenna assembly 200. The front cover 202 may include a plurality of front fastener holes (not shown), which may extend into the front cover 202. In some implementations, the front fastener holes may be tapered. In some implementations, the front fastener holes may be threaded. These plurality of front fastener holes may be aligned with back cover holes 222 of the back cover 204 in the assembled configuration, and fasteners 214 (see e.g., FIG. 7B) can be positioned within the front fastener holes and the back cover holes 212 to secure the front cover 202 and the internal components of the antenna assembly 200 to the back cover 204.

FIG. 7A illustrates a front perspective view of the antenna assembly 200 of FIG. 5 with the front cover 202 removed to further illustrate the internal component of the antenna assembly 200. The antenna assembly 200 can include one or more printed circuit board "PCB" bases. In the illustrated example, the antenna assembly 200 includes a first PCB base 216 that support the first multi-element multi-band antenna 206 and a second PCB base 316 that supports the second multi-element multi-band antenna 306. In some implementations, the antenna assembly 200 can include a single PCB base that supports both the first multi-element multi-band antenna 206 and the second multi-element multi-band antenna 306. However, having a multiple PCB bases 216, 316 can provide a benefit of providing separation between the first multi-element multi-band antenna 206 and the multi-element multi-band antenna 306 while reducing the material cost of a larger single PCB base. For example, a gap is generally desirable between the conducting surface of the first multi-element multi-band antenna 206 and the second multi-element multi-band antenna 306 (e.g., in particular the low band arms of the first multi-element multi-band antenna 206 and second multi-element multi-band antenna 306) The first PCB base 216 can support the first multi-element multi-band antenna 206. For example, the first multi-element multi-band antenna 206 can be formed on the first PCB base 216. Similarly, the second PCB base 316 can support the second multi-element multi-band antenna 306. For example, the second multi-element multi-band antenna 306 can be formed on the second PCB base 316. The PCB bases 216, 316 can be housed within the antenna assembly 200

(e.g., between the front cover 202 and the back cover 204). The first PCB base 216 can be adjacent to the second PCB base 316. In some cases, the first PCB base 216 can be coplanar to the second PCB base 316. In some cases, the PCB bases 216, 316 may be fiberglass reinforced with epoxy (e.g., FR4). The PCB bases 216, 316 may provide structure for the radiating elements/portions of the multi-element multi-band antennas 206, 306. For example, the radiating elements/portions of the multi-element multi-band antennas 206, 306 can be conductive material (e.g., copper) that can be etched into the structure of the PCB bases 216, 316. The size of the spacing between the first PCB base 216 and the second PCB base 316 can impact the performance of the antenna assembly 200. For example, a larger spacing can increase the diversity gain between the ports, which can yield a better end user experience.

FIG. 7B illustrates a front perspective view of the antenna assembly 200 of FIG. 5 with the front cover 202 and the PCB bases 216, 316 removed. As shown, the internal side of the back cover 204 can include internal ribbing structure 218. The PCB bases 216, 316 can be positioned on and supported by the internal ribbing structure 218. The internal ribbing structure 218 can provide separation between the multi-element multi-band antennas 206, 306 and the back cover 204. Additionally, the structure of the front cover 202 and back cover 204 can provide electrical isolation between the fasteners (e.g., fasteners 214) and the electrically conductive surfaces of the PCB bases 216, 316.

With continue reference to FIGS. 7A and 7B, the back cover 204 can include one or more cable opening. In the illustrated example, the back cover 204 include a first cable opening 226 and a second cable opening 326. The cable opening 206, 306 can be configured to receive coaxial cables (not shown) for the antenna assembly 200. The coaxial cables can extend through the cable opening 206, 306 and be coupled to the first multi-element multi-band antenna 206 and the second multi-element multi-band antenna 306, as described herein.

FIGS. 8A and 8B illustrates a top side view and a bottom side view of the first multi-element multi-band antenna 206 and the first PCB base 216. The first multi-element multi-band antenna 206 can include one or more multiband antenna elements. In the illustrated example, the first multi-element multi-band antenna 206 includes a first multiband antenna element 220 and a second multiband antenna element 220'. In the illustrated example, some portions of the multiband antenna elements 220, 220' are formed on a first/front side 217 of the first PCB base 216 and some portions of the multiband antenna elements 220, 220' are formed on a second/back side 219 of the first PCB base 216. In other implementations, the entire first multiband antenna element 220 and/or the entire second multiband antenna element 220' could be formed on either the front side 217 or the back side 219 of the first PCB base 216.

The first multi-element multi-band antenna 206 can include a first ground plane 222 (also referred to herein as the "first ground reference 222"). The first ground plane 222 may serve as the ground reference for at least the first multiband antenna element 220. The first ground plane 222 can be coupled to/extend from a first connection interface 224. The first connection interface 224 can be configured to connect the first multiband antenna element 220 to a ground connector of a first coaxial cable (not shown). For example, an edge connector 228 of the first coaxial cable (see e.g., FIG. 7A) can be mechanically and/or electrically coupled to the first connection interface 224 (e.g., using solder). The first multi-element multi-band antenna 206 can include a second ground plane 222' (also referred to herein as the "second ground reference 222'"). The second ground plane 222' may serve as the ground reference for at least the second multiband antenna element 220'. The second ground plane 222' can be coupled to/extend from a second connection interface 224'. The second connection interface 224' can be configured to connect the second multiband antenna element 220' to a ground connector of a second coaxial cable (not shown). For example, an edge connector 228' of the second coaxial cable (see e.g., FIG. 7A) can be mechanically and/or electrically coupled to the second connection interface 224' (e.g., using solder). Where the first multiband antenna element 220 and second multiband antenna element 220' are formed on both sides 217, 219 of the first PCB base 216, the edge connectors 228, 228' may be soldered to both sides 217, 219 of the first PCB base 216. For example, the first and second connection interfaces 224 can be formed on both sides 217, 219 of the first PCB base 216. The ground planes 222, 222' may serve as a reference point for operation of the antenna assembly 200. The ground planes 222, 222' can be microstrip transmission lines.

The first multi-element multi-band antenna 206 can include a first feed point 230 and a first balun 232. The first feed point 230 can be coupled to the first ground plane 222 and the first balun 232. For example, the first feed point 230 can be the point where the electrical energy from the first coaxial cable is transferred to the first balun 232. The first multi-element multi-band antenna 206 can include a microstrip line 234 (also referred to herein as a "feed line" 234) The microstrip line 234 can be on the back side 219 of the first PCB base 216. The center conductor of the first coaxial cable can attach to the microstrip line 334. The first ground plane 222 can be the groundplane for the microstrip line 234. The first ground plane 222 and the microstrip line 234 can form the microstrip transmission line for the first multiband antenna element 220. With reference to FIG. 8B, the microstrip line 234 extends from/is coupled to the first connection interface 224. In this example, the first balun 232 extends to the radiating elements of the first multiband antenna element 220 on front side 217 of the first PCB base 216 and the microstrip line 234 extends to the radiating elements of the first multiband antenna element 220 on the back side 219 of the first PCB base 216. The two distinct conducting surface that form the microstrip transmission line (e.g., the microstrip line 234 and the first ground plane 222) can be used together to electrically excite the pairs of dipole arms that make up the first multiband antenna element 220, as explained herein. The impedance of the first feed point 230 can vary, depending on the application of the antenna assembly 200. In one example, the first feed point 230 can have an impedance of 50-ohms. As explained herein, the dipole arms of the first multiband antenna element 220 can have alternating polarity (e.g., alternating extension in the positive and negative Z-direction) to assist in the impedance matching and pattern construction of the multi-element multi-band antenna 206.

The tuning of the radiating elements of the first multiband antenna element 220 can be achieved by balancing a number of factors. These factors can include one or more of: the width of the balun 232, the microstrip line 234, the offset of the first balun 232 relative to the microstrip line 234 on the first PCB base 216 (e.g., in the Z-direction), the spacing of the first balun 232 relative to the microstrip line 234 through the first PCB base 216 (e.g., in the X-direction), the dielectric constant ("DK") of the first PCB base 216, the geometry of the individual arms of the first multiband antenna element 220 and their spacing relative to each other, the feed impedance, the space from the first ground plane 222 for the feed transmission lines, and/or the like.

With continued reference to FIGS. 8A and 8B, the first multiband antenna element 220 can include a number of radiating elements/arms/dipole arms. For example, the first multiband antenna element 220 can include one or more high-band arms, one or more mid-band arms, and/or one or more low-band arms. In the illustrated embodiment, the first multiband antenna element 220 includes pairs of dipole arms for high-band, mid-band, and low-band radiation. As shown, in the illustrated example, the first multiband antenna element 220 can include a first low-band radiating element 236 and a second low-band radiating element 238 (also referred to herein as the first low-band arm 236 and the second low-band arm 238 respectively). The low-band arms 236, 238 can be configured for low band radiation (e.g., radiation less than approximately 1 GHz). The low-band arms 236, 238 can form a single dipole of the first multiband antenna element 220 (e.g., the driven element and is counterpoise). In the illustrated example, the first low-band radiating element 236 is formed on the front side 217 of the first PCB base 216 and the second low-band radiating element 238 is formed on the back side 219 of the first PCB base 216. However, this arrangement is not required, but can provide a convenient manner of reducing the number of plated through holes include in the PCB base 216. The first low-band radiating element 236 can be coupled to the first balun 232. The first low-band radiating element 236 can be L-shaped. For example, the first low-band radiating element 236 can include a first portion 240 and a second portion 242 where the second portion 242 is perpendicular to the first portion 240 (e.g., there can be an approximately 90-degree bend between the first portion 240 and second portion 242). The first balun 232 can be coupled to the first portion 240. The first portion 240 can extend in the positive Z-direction from the first balun 232. The first portion 240 and second portion 242 can be rectangularly shaped. In other implementations, the first low-band radiating element 236 can have a different shape. In some cases, the first low-band radiating element 236 can be positioned near one or more edges of the first PCB base 216. For example, the first portion 240 can extend along a left-side edge of the first PCB base 216 (e.g., in the positive Z-direction) and the second portion 242 can extend along a top-side edge of the first PCB base 216 (e.g., in the positive Y-direction). This arrangement can reduce the size of the PCB base 216. In some cases, the first low-band radiating element 236 can include a cutout 244. The cutout 244 can be a portion of the first low-band radiating element 236 where the conductive material on the first PCB base 216 is not present or has been removed. In some cases, a hole (e.g., for cover coupling purposes) extending through the first PCB base 216 can be positioned in the cutout 244, however, this may not be related to the properties of the cutout 244. For example, a hole extending through the first PCB base 216 is not required to achieve the desired effect of the cutout 244. The cutout 244 can be positioned at the joining of the first portion 240 and second portion 242. For example, the cutout 244 can be positioned at the 90-degree bend. The cutout 244 can have any suitable shape. For example, the cutout 244 can be circular, semi-circular, rectangular, and/or the like. In the illustrated example, the cutout 244 has a semi-circular shape. The cutout 244 can allow for a discontinuity in the current flow at higher frequencies. The cutout 244 can allow the first low-band radiating element 236 to assist with the radiation pattern shape at higher bands. In some cases, the cutout 244 can assist with the impedance match as well. For example, the current crowding at higher order modes for the low band dipole (e.g., the first low-band radiating element 236 and second low-band radiating element 238) allows for additional resonances that are beneficial for the operation of the entire radiating structure of the first multiband antenna element 220 at the higher bands.

The second low-band radiating element 238 can be coupled to the microstrip line 234. The second low-band radiating element 238 can be L-shaped. For example, the second low-band radiating element 238 can include a first portion 246 and a second portion 248 where the second portion 248 is perpendicular to the first portion 246 (e.g., there can be an approximately 90-degree bend between the first portion 246 and second portion 248). The microstrip line 234 can be coupled to the first portion 246. The first portion 246 can extend in the negative Z-direction from the first balun 232. The first portion 246 and second portion 248 can be rectangularly shaped. In other implementations, the second low-band radiating element 238 can have a different shape. In some cases, the second low-band radiating element 238 can be positioned near one or more edges of the first PCB base 216. For example, the first portion 246 can extend along a left-side edge of the first PCB base 216 (e.g., in the negative Z-direction) and the second portion 248 can extend along a bottom-side edge of the first PCB base 216 (e.g., in the positive Y-direction). As such, the first low-band radiating element 236 can be a mirror image of the second low-band radiating element 238. The combination of the first low-band radiating element 236 and second low-band radiating element 238 can be C-shaped. In some cases, the second low-band radiating element 238 can include a cutout 250. In some cases, a hole (e.g., for cover coupling purposes) extending through the first PCB base 216 can be positioned in the cutout 250, however, this may not be related to the properties of the cutout 250. For example, a hole extending through the first PCB base 216 is not required to achieve the desired effect of the cutout 250. The cutout 250 can be positioned at the joining of the first portion 246 and second portion 248. For example, the cutout 250 can be positioned at the 90-degree bend. The cutout 250 can have any suitable shape. For example, the cutout 250 can be circular, semi-circular, rectangular, and/or the like. In the illustrated example, the cutout 250 has a semi-circular shape. The cutout 250 can allow for a discontinuity in the current flow at higher frequencies. The cutout 250 can allow the second low-band radiating element 238 to assist with the radiation pattern shape at higher bands. In some cases, the cutout 250 can assist with the impedance match as well. For example, the current crowding at higher order modes for the low band dipole (e.g., the first low-band radiating element 236 and second low-band radiating element 238) allows for additional resonances that are beneficial for the operation of the entire radiating structure of the first multiband antenna element 120 at the higher bands.

The first multiband antenna element 220 can include one or more mid-band radiating elements/arms/dipole arms. In the illustrated example, the first multiband antenna element 220 can include a first mid-band radiating element 252 and a second mid-band radiating element 254 (also referred to herein as the first mid-band arm 252 and the second mid-band arm 254 respectively). The mid-band arms 252, 254 can be configured for mid band radiation (e.g., radiation approximately between 1700 MHz to 2700 MHz). The mid-band arms 252, 254 can form a single dipole of the first multiband antenna element 220 (e.g., the driven element and is counterpoise). The first mid-band radiating element 252 and the second mid-band radiating element 254 can be formed on either side of the first PCB base 216. In the illustrated example, the first mid-band radiating element 252 is formed on the front side 217 of the first PCB base 216 and the second mid-band radiating element 254 is formed on the back side 219 of the first PCB base 216. In this arrangement, the midband arms 252, 254 are transposed in orientation compared to the low-band arms 236, 238. As noted herein, this arrangement can assist with the impedance matching and forming of the radiating pattern in the first multiband antenna element 220. For example, on the front side 217 of the first PCB base 216, the first low-band radiating element 236 extends in the positive Z-direction and the first mid-band radiating element 252 extends in the negative Z-direction. Similarly, the second low-band radiating element 238 extends in the negative Z-direction and the second mid-band radiating element 254 extends in the positive Z-direction. The first mid-band radiating element 252 can be coupled to the first balun 232. The first mid-band radiating element 252 can extend in the negative Z-direction from the first balun 232. The second mid-band radiating element 254 can be coupled to the microstrip line 234. The second mid-band radiating element 254 can extend in the positive Z-direction from the microstrip line 234. The mid-band radiating elements 252, 254 can be rectangularly shaped. In other implementations, the mid-band radiating elements 252, 254 can be shaped differently. In some cases, one or more holes can extend through one or both of the mid-band arms 252, 254.

The first multiband antenna element 220 can include one or more high-band radiating elements/arms/dipole arms. In the illustrated example, the first multiband antenna element 220 can include a first high-band radiating element 258 and a second high-band radiating element 260 (also referred to herein as the first high-band arm 258 and the second high-band arm 260 respectively). The high-band arms 258, 260 can be configured for high band radiation (e.g., radiation approximately above 2700 MHz). The high-band arms 258, 260 can form a single dipole of the first multiband antenna element 120 (e.g., the driven element and is counterpoise). The first high-band radiating element 258 and the second high-band radiating element 260 can be formed on either side of the first PCB base 216. In the illustrated example, the first high-band radiating element 258 is formed on the front side 217 of the first PCB base 216 and the second high-band radiating element 260 is formed on the back side 219 of the first PCB base 216. In this arrangement, the high-band arms 258, 260 are transposed in orientation compared to the mid-band arms 252, 254. For example, on the front side 217 of the first PCB base 216, the first high-band radiating element 258 extends in the positive Z-direction (e.g., in the same direction as the first low-band radiating element 236) and the first mid-band radiating element 252 extends in the negative Z-direction. Similarly, the second high-band radiating element 260 extends in the negative Z-direction (e.g., in the same direction as the second low-band radiating element 238) and the second mid-band radiating element 254 extends in the positive Z-direction. The first high-band radiating element 258 can be coupled to the first balun 232. The first high-band radiating element 258 can extend in the positive Z-direction from the first balun 232. The second high-band radiating element 260 can be coupled to the microstrip line 234. The second high-band radiating element 260 can extend in the negative Z-direction from the microstrip line 234. As such, the second high-band radiating element 260 can be a mirror image of the first high-band radiating element 258. The high-band radiating elements 258, 260 can be diamond/bi-cone shaped. In other implementations, the high-band radiating elements 258, 260 can have different shapes. In some cases, having a bi-cone shape of the high-band radiating elements 258, 260 can improve the impedance bandwidth at the upper end of the frequency band for the high-band radiating elements 258, 260. In some cases, one or more holes can extend through one or more of the high-band arms 258, 260.

In some cases, the high-band arms 258, 260 can be the closest to the center of the first PCB base 216 and the first connection interface 224. Moving in the negative Y-direction from the first connection interface 224, the first multiband antenna element 220 can be arranged such that the low-band arms 236, 238 are positioned furthest from the first connection interface 224 in the Y-direction and the high-band arms 258, 260 are the closest to the first connection interface 224, with the mid-band arms 252, 254 between the high-band arms 258, 260 and the low-band arms 236, 238 in the Y-direction.

As noted herein, the first multi-element multi-band antenna 206 can include a first multiband antenna element 220 and a second multiband antenna element 220' formed on the first PCB base 216. Some features of the second multiband antenna element 220' are similar or identical to feature of the first multiband antenna element 220 in at least FIGS. 8A and 8B. Thus, reference numerals used to designate the various features or components of the first multiband antenna element 220 are identical to those used for identifying the corresponding features or components of the second multiband antenna element 220' in at least FIGS. 8A and 8B, except that the numerical identifiers for the second multiband antenna element 220' include a “prime”. Therefore, the structure and description for the various features of the first multiband antenna element 220 and the operation thereof as described in at least FIGS. 8A and 8B are understood to apply to the corresponding features of the second multiband antenna element 220', except as described differently below.

The second multiband antenna element 220' differs from the first multiband antenna element 220 in the position and orientation on the first PCB base 216. In some implementations, the second multiband antenna element 220' can be a mirror image of the first multiband antenna element 220 based on a centerline extending in the Z-direction between the first connection interface 224 and the second connection interface 224'. However, in the illustrated embodiment, the first multiband antenna element 220 is not a mirror image of the second multiband antenna element 220'. The second portion 242' of the first low-band radiating element 236' of the second multiband antenna element 220' can extend from the first portion 240' in the negative Y-direction. Similarly, second portion 248' of the second low-band radiating element 238' of the second multiband antenna element 220' can extend from the first portion 246' in the negative Y-direction.

In some implementations, the first multiband antenna element 220 and the second multiband antenna element 220' may be formed primarily or entirely on the one side of the first PCB base 216 (e.g., the front side 217). However, having the multiband antenna elements 220, 220' formed on both sides of the first PCB base 216 can provide certain benefits. For example, this arrangement can reduce the complexity of the design. For example, the complexity of the balun 232, 232', the microstrip lines 234, 234' in the multiband antenna elements 220, 220'. In another example, having the multiband antenna elements 220, 220' on both sides of the first PCB base 216 can provide a benefits of allowing the overall size of the antenna assembly 200 to be reduced. For example, when the multiband antenna elements 220, 220' are formed on one side of the first PCB base 216, the size of the first PCB base 216 may need to be increased, which can cause the overall size of the antenna assembly 200 to increase. Compact antennas are desirable, as such, an antenna assembly 200 with a smaller volumetric profile is often desirable. Additionally, having the multiband antenna elements 220, 220' on both sides of the PCB base 216 can reduce the complexity of the balun.

As noted herein, the antenna assembly 200 can include the first multi-element multi-band antenna 206 and the second multi-element multi-band antenna 306. The first multi-element multi-band antenna 206 can be formed on the first PCB base 216 and the second multi-element multi-band antenna 306 can be formed on the second PCB base 316. The second multi-element multi-band antenna 306 and the second PCB base 316 can be similar or identical to the first multi-element multi-band antenna 206 and the first PCB base 216 described in FIGS. 5-8B. Thus, reference numerals used to designate the various features or components of the first multi-element multi-band antenna 206 and first PCB base 216 are identical to those used for identifying the corresponding features or components of the second multi-element multi-band antenna 306 and second PCB base 316 in FIGS. 5-8B, except that the numerical identifiers for the second multi-element multi-band antenna 306 and second PCB base 316 begin with a "3" instead of a "2". Therefore, the structure and description for the various features of the first multi-element multi-band antenna 206 and first PCB base 216 and the operation thereof as described in FIGS. 5-8B are understood to apply to the corresponding features of the second multi-element multi-band antenna 306 and second PCB base 316. While most of the features and components of the second multi-element multi-band antenna 306 and second PCB base 316 are not illustrated, it is recognized that the second multi-element multi-band antenna 306 and second PCB base 316 can be identical to the first multi-element multi-band antenna 206 and second PCB base 316 respectively.

In some implementations, the antenna assembly 200 can be optimized for the C-Band, which can span approximately 4.0 GHz to 8.0 GHz. For example, when operating on a 5G cellular network, optimizing the antenna assembly 200 for the C-band can provide a balance between high data speeds and quality coverage. For example, in some cases, the C-band can provide a compromise between higher frequencies used for ultra-fast data transfer (e.g., millimeter-wave bands) and lower frequencies used for broader coverage (e.g., sub-6 GHz bands) in 5G networks.

In some implementations, the antenna assembly 200 can include one or more additional multi-element multi-band antennas (e.g., similar or identical to the first multi-element multi-band antenna and the second multi-element multi-band antenna 306). For example, the antenna assembly 200 can include more than three, more than four, more than six, more than eight, more than ten, sixteen, thirty-two, and/or the like more multi-element multi-band antennas. In one example, including additional multi-element multi-band antennas in the antenna assembly 200 can make the C-band frequency reach further distance to achieve higher gain. Other benefits can also be achieved by including more multi-element multi-band antennas.

The particular implementations disclosed above are illustrative only, as the application may be modified and practiced in different but equivalent manners apparent to those skilled in the art having the benefit of the teachings herein. It is therefore evident that the particular implementations disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

EXAMPLE CLAUSES

Various examples of systems relating to an antenna system are found in the following clauses:

Clause 1. An antenna assembly comprising: a front cover; a back cover, the back cover configured to be coupled to the front cover; a PCB base positioned between the front cover and the back cover; a first multi-band antenna element formed on the PCB base, the first multi-band antenna element comprising: a first ground plane; one or more first low-band radiating elements; one or more first mid-band radiating elements; and one or more first high-band radiating elements; and a second multi-band antenna element formed on the PCB base, the second multi-band antenna element comprising: a second ground plane; one or more second low-band radiating elements; one or more second mid-band radiating elements; and one or more second high-band radiating elements.

Clause 2. The antenna assembly of Clause 1, wherein the first multi-band antenna element is formed on a first side of the PCB base and the second multi-band antenna element is formed on the first side of the PCB base.

Clause 3. The antenna assembly of Clause 1, wherein the first multi-band antenna element is formed on both a first side and a second side of the PCB base and the second multi-band antenna element is formed on both the first side and the second side of the PCB base.

Clause 4. The antenna assembly of Clause 3, wherein at least one of the one or more first low-band radiating elements is formed on the first side of the PCB base and at least one of the one or more first low-band radiating elements is formed on the second side of the PCB base.

Clause 5. The antenna assembly of Clause 3, wherein at least one of the one or more first mid-band radiating elements is formed on the first side of the PCB base and at least one of the one or more first mid-band radiating elements is formed on the second side of the PCB base.

Clause 6. The antenna assembly of Clause 3, wherein at least one of the one or more first high-band radiating elements is formed on the first side of the PCB base and at least one of the one or more first high-band radiating elements is formed on the second side of the PCB base.

Clause 7. The antenna assembly of Clause 1, wherein the one or more first low-band radiating elements and the one or more second low-band radiating elements are L-shaped.

Clause 8. The antenna assembly of Clause 1, wherein the one or more first mid-band radiating elements and the one or more second mid-band radiating elements are rectangularly shaped.

Clause 9. The antenna assembly of Clause 1, wherein the one or more first high-band radiating elements and the one or more second high-band radiating elements are bi-cone shaped.

Clause 10. A multi-band antenna element formed on a PCB base, the multi-band antenna element comprising: a ground plane; one or more low-band radiating elements; one or more mid-band radiating elements; and one or more high-band radiating elements.

Clause 11. The multi-band antenna element of Clause 10, wherein the one or more low-band radiating elements comprises a first low-band arm and a second low-band arm, wherein the one or more mid-band radiating elements comprises a first mid-band arm and a second mid-band arm, wherein the one or more high-band radiating elements comprises a first high-band arm and a second high-band arm.

Clause 12. The multi-band antenna element of Clause 11, wherein the first low-band arm, the first mid-band arm, and the first high-band arm are formed on a first side of the PCB base, wherein the second low-band arm, the second mid-band arm, and the second high-band arm are formed on a second side of the PCB base.

Clause 13. The multi-band antenna element of Clause 11, where the first low-band arm and the second low-band arm are L-shaped.

Clause 14. The multi-band antenna element of Clause 13, where at least one of the first low-band arm and the second low-band arm includes a cutout positioned in a 90-degree bend of the L-shape.

Clause 15. The multi-band antenna element of Clause 14, wherein the cutout is semi-circular shaped and is configured to allow for a discontinuity in a current flow at frequencies above a threshold.

Clause 16. The multi-band antenna element of Clause 11, wherein the first mid-band arm and the second mid-band arm are rectangularly shaped.

Clause 17. The multi-band antenna element of Clause 11, wherein the first high-band arm and the second high-band arm are bi-cone shaped.

Clause 18. The multi-band antenna element of Clause 12, wherein the first low-band arm and the first high-band arm extend in a first direction and the first mid-band arm extends in a second direction, the second direction opposite the first direction.

Clause 19. The multi-band antenna element of Clause 18, wherein the second low-band arm and the second high-band arm extend in the second direction and the first mid-band arm extends in the first direction.

Clause 20. An antenna assembly comprising: a front cover; a back cover, the back cover configured to be coupled to the front cover; a first PCB base positioned between the front cover and the back cover; a second PCB base positioned between the front cover and the back cover; the second PCB base adjacent to the first PCB base; a first multi-band antenna element formed on the first PCB base; a second multi-band antenna element formed on the first PCB base; a third multi-band antenna element formed on the second PCB base; and a fourth multi-band antenna element formed on the second PCB base.

Clause 21. The antenna assembly of Clause 20, wherein the first multi-band antenna element and the second multi-band antenna element are formed on a first side of the first PCB base and the third multi-band antenna element and the fourth multi-band antenna element are formed on a first side of the second PCB base.

Clause 22. The antenna assembly of Clause 20, wherein the first multi-band antenna element and the second multi-band antenna element are formed on both a first side and a second side of the first PCB base and the third multi-band antenna element and the fourth multi-band antenna element are formed on both a first side and a second side of the second PCB base.

Clause 23. The antenna assembly of Clause 20, where each of the first multi-band antenna element, the second multi-band antenna element, the third multi-band antenna element, and the fourth multi-band antenna element comprise: a ground plane; one or more low-band radiating elements; one or more mid-band radiating elements; and one or more high-band radiating elements.

Clause 24. The antenna assembly of Clause 23, wherein the one or more low-band radiating elements are L-shaped.

Clause 25. The antenna assembly of Clause 23, wherein the one or more mid-band radiating elements are rectangularly shaped.

Clause 26. The antenna assembly of Clause 23, wherein the one or more high-band radiating elements are bi-cone shaped.

ADDITIONAL CONSIDERATIONS AND TERMINOLOGY

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations, and may be defined by claims as presented herein or as presented in the future.

Conditional language, such as “can,” “could,” “might,” or “may,” unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z." unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately." "about." "generally." and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. An antenna assembly comprising:
- a front cover;
- a back cover, the back cover configured to be coupled to the front cover;
- a PCB base positioned between the front cover and the back cover;
- a first multi-band antenna element formed on a first side and a second side of the PCB base, the first multi-band antenna element comprising:
  - a first ground plane;
  - one or more first low-band radiating elements;
  - one or more first mid-band radiating elements; and
  - one or more first high-band radiating elements; and
- a second multi-band antenna element formed on the first side and the second side of the PCB base, the second multi-band antenna element comprising:
  - a second ground plane;
  - one or more second low-band radiating elements;
  - one or more second mid-band radiating elements; and
  - one or more second high-band radiating elements.

2. The antenna assembly of claim 1, wherein at least one of the one or more first low-band radiating elements is formed on the first side of the PCB base and at least one of the one or more first low-band radiating elements is formed on the second side of the PCB base.

3. The antenna assembly of claim 1, wherein at least one of the one or more first mid-band radiating elements is formed on the first side of the PCB base and at least one of the one or more first mid-band radiating elements is formed on the second side of the PCB base.

4. The antenna assembly of claim 1, wherein at least one of the one or more first high-band radiating elements is formed on the first side of the PCB base and at least one of the one or more first high-band radiating elements is formed on the second side of the PCB base.

5. The antenna assembly of claim 1, wherein the one or more first low-band radiating elements and the one or more second low-band radiating elements are L-shaped.

6. The antenna assembly of claim 1, wherein the one or more first mid-band radiating elements and the one or more second mid-band radiating elements are rectangularly shaped.

7. The antenna assembly of claim 1, wherein the one or more first high-band radiating elements and the one or more second high-band radiating elements are bi-cone shaped.

8. A multi-band antenna element formed on a PCB base, the multi-band antenna element comprising:
- a ground plane;
- one or more low-band radiating elements comprising a first low-band arm and a second low-band arm;
- one or more mid-band radiating elements comprising a first mid-band arm and a second mid-band arm; and
- one or more high-band radiating elements comprising a first high-band arm and a second high-band arm,
- wherein the first low-band arm, the first mid-band arm, and the first high-band arm are formed on a first side of the PCB base, and wherein the second low-band arm, the second mid-band arm, and the second high-band arm are formed on a second side of the PCB base.

9. The multi-band antenna element of claim 8, where the first low-band arm and the second low-band arm are L-shaped.

10. The multi-band antenna element of claim 9, where at least one of the first low-band arm and the second low-band arm includes a cutout positioned in a 90-degree bend of the L-shape.

11. The multi-band antenna element of claim 10, wherein the cutout is semi-circular shaped and is configured to allow for a discontinuity in a current flow at frequencies above a threshold.

12. The multi-band antenna element of claim 8, wherein the first mid-band arm and the second mid-band arm are rectangularly shaped.

13. The multi-band antenna element of claim 8, wherein the first high-band arm and the second high-band arm are bi-cone shaped.

14. The multi-band antenna element of claim 8, wherein the first low-band arm and the first high-band arm extend in a first direction and the first mid-band arm extends in a second direction, the second direction opposite the first direction.

15. The multi-band antenna element of claim 14, wherein the second low-band arm and the second high-band arm extend in the second direction and the first mid-band arm extends in the first direction.

16. An antenna assembly comprising:
- a front cover;

a back cover, the back cover configured to be coupled to the front cover;

a first PCB base positioned between the front cover and the back cover;

a second PCB base positioned between the front cover and the back cover; the second PCB base adjacent to the first PCB base;

a first multi-band antenna element formed on the first PCB base;

a second multi-band antenna element formed on the first PCB base;

a third multi-band antenna element formed on the second PCB base; and a fourth multi-band antenna element formed on the second PCB base, wherein the first multi-band antenna element and the second multi-band antenna element are formed on both a first side and a second side of the first PCB base and the third multi-band antenna element and the fourth multi-band antenna element are formed on both a first side and a second side of the second PCB base.

17. The antenna assembly of claim 16, where each of the first multi-band antenna element, the second multi-band antenna element, the third multi-band antenna element, and the fourth multi-band antenna element comprise:

a ground plane;

one or more low-band radiating elements;

one or more mid-band radiating elements; and one or more high-band radiating elements.

18. The antenna assembly of claim 17, wherein the one or more low-band radiating elements are L-shaped.

19. The antenna assembly of claim 17, wherein the one or more mid-band radiating elements are rectangularly shaped.

20. The antenna assembly of claim 17, wherein the one or more high-band radiating elements are bi-cone shaped.

* * * * *